US012763461B2

(12) United States Patent
Khan et al.

(10) Patent No.: US 12,763,461 B2
(45) Date of Patent: Oct. 13, 2026

(54) ANTENNA ASSEMBLY AND COMMUNICATION SYSTEM

(71) Applicant: 3M INNOVATIVE PROPERTIES COMPANY, St. Paul, MN (US)

(72) Inventors: Zulfiqar A. Khan, Cupertino, CA (US); Gregory M. Haugen, Minneapolis, MN (US); Jaewon Kim, Woodbury, MN (US); Christian Weinmann, Alsdorf (DE); Badri Veeraraghavan, Woodbury, MN (US); Bernhard Schneider, Herne (DE); Jeffrey A. Tostenrude, Leander, TX (US); Charles L. Bruzzone, Woodbury, MN (US); Lars Schrix, Duisburg (DE); Jennifer J. Sokol, Mahtomedi, MN (US); Andreea Sabo, Neuss (DE); Pontus S.B. Broddner, Sundbyberg (SE)

(73) Assignee: 3M Innovative Properties Company, St. Paul, MN (US)

( * ) Notice: Subject to any disclaimer, the term of this patent is extended or adjusted under 35 U.S.C. 154(b) by 294 days.

(21) Appl. No.: 18/293,872

(22) PCT Filed: Aug. 23, 2022

(86) PCT No.: PCT/IB2022/057889

§ 371 (c)(1),
(2) Date: Jan. 31, 2024

(87) PCT Pub. No.: WO2023/031731

PCT Pub. Date: Mar. 9, 2023

(65) Prior Publication Data

US 2025/0125535 A1 Apr. 17, 2025

Related U.S. Application Data

(60) Provisional application No. 63/260,763, filed on Aug. 31, 2021.

(51) Int. Cl.
*H01Q 3/26* (2006.01)
*H01Q 19/06* (2006.01)
*H01Q 21/06* (2006.01)

(52) U.S. Cl.
CPC .......... *H01Q 3/2658* (2013.01); *H01Q 19/06* (2013.01); *H01Q 21/06* (2013.01)

(58) Field of Classification Search
CPC ...... H01Q 3/2658; H01Q 1/246; H01Q 15/02; H01Q 15/08; H01Q 15/10; H01Q 19/06; H01Q 19/062; H01Q 21/061
See application file for complete search history.

(56) References Cited

U.S. PATENT DOCUMENTS 7,034,748 B2 4/2006 Kajiya
8,264,410 B1 9/2012 Wang
(Continued)

FOREIGN PATENT DOCUMENTS

EP 2330685 A1 * 6/2011 .......... H01Q 3/2658
KR 1020050061391 A 6/2005
(Continued)

OTHER PUBLICATIONS

B.L. Zhao et al., A Luneburg Lens Antenna Composed of Gradient Index Metamaterials based on 3D printing, 2019 International Symposium on Antennas and Propagation (ISAP), p. 1-3 (Year: 2019).*
(Continued)

*Primary Examiner* — Ladimir Magloire
*Assistant Examiner* — Fred H Mull
(74) *Attorney, Agent, or Firm* — Gregg H. Rosenblatt

(57) ABSTRACT

An antenna assembly includes a phased array antenna having an array of spaced apart antenna elements arranged on a horizontal surface and having an axis of symmetry, and a lens disposed on the phased array antenna. The lens sub-
(Continued)

stantially covers the antenna elements. The lens includes a substantially planar bottom surface. The bottom surface and tops of the antenna elements define a gap therebetween. For a second vertical plane orthogonal to the horizontal surface and including the axis of symmetry, the antenna assembly steers a beam in a second vertical plane having a 3 dB beam width W1 when steered along a first direction making an angle of less than 10 degrees with a normal to the horizontal surface and a 3 dB beam width W2 when steered along a second direction making an angle of greater than 40 degrees with the normal. W1 and W2 within 35% of each other.

4 Claims, 15 Drawing Sheets

(56) References Cited

U.S. PATENT DOCUMENTS

| | | | | |
|---|---|---|---|---|
| 10,256,551 | B2 | 4/2019 | Shehan | |
| 2010/0079354 | A1 | 4/2010 | Lam et al. | |
| 2014/0159976 | A1 | 6/2014 | De Rochemont | |
| 2019/0319355 | A1* | 10/2019 | Ko | H01Q 3/2658 |
| 2020/0403309 | A1* | 12/2020 | Mahanfar | H01Q 3/2658 |

FOREIGN PATENT DOCUMENTS

| | | | |
|---|---|---|---|
| KR | 1020187780000 | B1 | 8/2019 |
| KR | 1021021270000 | B1 | 4/2020 |
| KR | 1021021290000 | B1 | 4/2020 |
| KR | 1021521800000 | B2 | 8/2020 |
| KR | 1020210062182 | A | 5/2021 |
| KR | 1020210135721 | A | 4/2022 |

OTHER PUBLICATIONS

T.A. Hill et al., Cascaded Fresnel Lens Antenna for Scan Loss Mitigation in Millimeter-Wave Access Points, IEEE Transactions on Antennas and Propagation, vol. 68, No. 10 (Year: 2020).*
International Search Report for PCT International Application No. PCT/IB2022/057889, mailed on Dec. 9, 2022, 4 pages.
Extended European Search Report from counterpart European Application No. 22863727.8 dated Jun. 23, 2025, 12 pp.
Hill Timothy A et al: "Cascaded Fresnel Lens Antenna for Scan Loss Mitigation in Millimeter-Wave Access Points", IEEE Transactions on Antennas and Propagation, IEEE, USA, vol. 68, No. 10, May 12, 2020 (May 12, 2020), pp. 6879-6892,XP011813214,ISSN: 0018-926X, DOI: 10.1109/TAP.2020.2992837[retrieved on Oct. 5, 2020].
Imbert Marc et al: "Design and performance evaluation of a switched-beam antenna array for 60 GHz WPAN applications", 2015 9th European Conference on Antennas and Propagation (EUCAP), EURAAP, Apr. 13, 2015 (Apr. 13, 2015), pp. 1-5, XP033213071, [retrieved on Aug. 27, 2015].
Qu Zhishu et al: "Wide-Angle Scanning Lens Fed by Small-Scale Antenna Array for 5G in Millimeter-Wave Band", IEEE Transactions on Antennas and Propagation, IEEE, USA, vol. 68, No. 5, Jan. 22, 2020 (Jan. 22, 2020), pp. 3635-3643, XP011786958, ISSN: 0018-926X, DOI: 10.1109/TAP.2020.2967086 [retrieved on May 4, 2020].

* cited by examiner

ANTENNA ASSEMBLY AND COMMUNICATION SYSTEM

CROSS REFERENCE TO RELATED APPLICATIONS

This application is a national stage filing under 35 U.S.C. 371 of PCT/IB2022/057889, filed Aug. 23, 2022, which claims the benefit of U.S. Provisional Application No. 63/260,763, filed Aug. 31, 2021, the disclosures of which are incorporated by reference in their entireties herein.

TECHNICAL FIELD

The present disclosure relates to an antenna assembly and a communication system including the antenna assembly.

BACKGROUND

Directional antennas, such as phased array antennas, may not provide a wide-angle coverage (e.g., 120 degrees or more) without a significant gain degradation at wider scan angles. This may be due to an undesired beam broadening which is typically observed at the wider scan angles of the phased array antennas.

SUMMARY

In a first aspect, the present disclosure provides an antenna assembly including a phased array antenna. The phased array antenna includes an array of spaced apart antenna elements arranged on a first horizontal surface and having a first axis of symmetry. The antenna assembly further includes a first lens disposed on the phased array antenna and substantially covering the antenna elements. The first lens includes a substantially planar first bottom surface facing and substantially parallel to the first horizontal surface. The first bottom surface and tops of the antenna elements define a gap therebetween. The first lens further includes a first top surface facing away from the first horizontal surface. The first lens includes a dielectric permittivity of between about 1.2 and about 2 at an operational frequency of the antenna assembly. The first lens further includes a loss tangent of between about 0.001 and about 0.005. For a second vertical plane substantially orthogonal to the first horizontal surface and including the first axis of symmetry, the antenna assembly steers a beam in the second vertical plane having a 3 decibel (dB) beam width W1 when steered along a first direction making an angle of less than about 10 degrees with a normal to the first horizontal surface and a 3 dB beam width W2 when steered along a second direction making an angle of greater than about 40 degrees with the normal, wherein W1 and W2 are within 35% of each other.

In a second aspect, the present disclosure provides an antenna assembly configured to operate at an operational frequency having a free space wavelength W0. The antenna assembly includes a regular array of antenna elements arranged in substantially parallel rows and columns on a first major surface of a substrate. The regular array of antenna elements defines a plane of symmetry substantially orthogonal to the first major surface. The antenna assembly further includes one or more lenses disposed on, and in combination covering, the regular array of antenna elements. The one or more lenses and the antenna elements define a gap therebetween. Each of the one or more lenses includes a top surface facing away from the antenna elements. Each of the one or more lenses includes a dielectric permittivity of between about 1.2 and about 2 at the operational frequency. The antenna assembly is configured to steer a beam in the plane of symmetry having a 3 dB beam width W1 when steered along a first direction making an angle of less than about 10 degrees with a normal to the first major surface and a 3 dB beam width W2 when steered along a second direction making an angle of greater than about 40 degrees with the normal, wherein W1 and W2 are within 35% of each other.

In a third aspect, the present disclosure provides an antenna assembly including a regular array of at least sixteen antenna elements. The sixteen antenna elements are arranged in an array of four substantially parallel rows and four substantially parallel columns on a first major surface of a substrate. The regular array of sixteen antenna elements defines a diagonal plane of symmetry substantially orthogonal to the first major surface and making an angle of between about 40 degrees and 50 degrees with the rows of antenna elements. The antenna assembly further includes a beam shaping element such as a beam focusing element disposed on and substantially covering the regular array of at least sixteen antenna elements. The beam shaping element and the sixteen antenna elements define a gap D therebetween, wherein 2 millimeters (mm)≤D≤3 mm. The beam shaping element has a dielectric permittivity of between about 1.2 and about 2 at a frequency of about 28 gigahertz (GHz), and a loss tangent of between about 0.001 and about 0.005. When the antenna assembly steers a beam in the plane of symmetry along a first direction making an angle of between about 40 degrees and about 50 degrees with a normal to the first major surface, then the steered beam attains a maximum gain at least when a maximum phase difference between the sixteen antenna elements is greater than by at least 2% as compared to a comparative antenna assembly that has a same construction except that it does not include the beam shaping element.

In a fourth aspect, the present disclosure provides a communication system including a regular array of antenna elements arranged in substantially parallel rows and substantially parallel columns on a first major surface of a substrate. The regular array of antenna elements defines a diagonal plane of symmetry substantially orthogonal to the first major surface and making an angle of between about 40 degrees and about 50 degrees with the rows of the antenna elements. The communication system further includes a beam shaping element disposed on and substantially covering the regular array of antenna elements. The beam shaping element and the antenna elements define a gap D therebetween, wherein 2 mm≤D≤3 mm. The beam shaping element has a dielectric permittivity of between about 1.2 and about 2 at a frequency of about 28 GHz, and a loss tangent of between about 0.001 and about 0.005. The communication system further includes a control apparatus coupled to, and energizing the antenna elements to steer a beam in the diagonal plane of symmetry. The beam has a 3 dB beam width W1 when steered along a first direction making an angle of less than about 10 degrees with a normal to the first major surface. The beam has a 3 dB beam width W2 when steered along a second direction making an angle of greater than about 40 degrees with the normal, wherein W1 and W2 are within 35% of each other.

BRIEF DESCRIPTION OF THE DRAWINGS

Exemplary embodiments disclosed herein is more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labelled with the same number.

DETAILED DESCRIPTION

Figure 1:
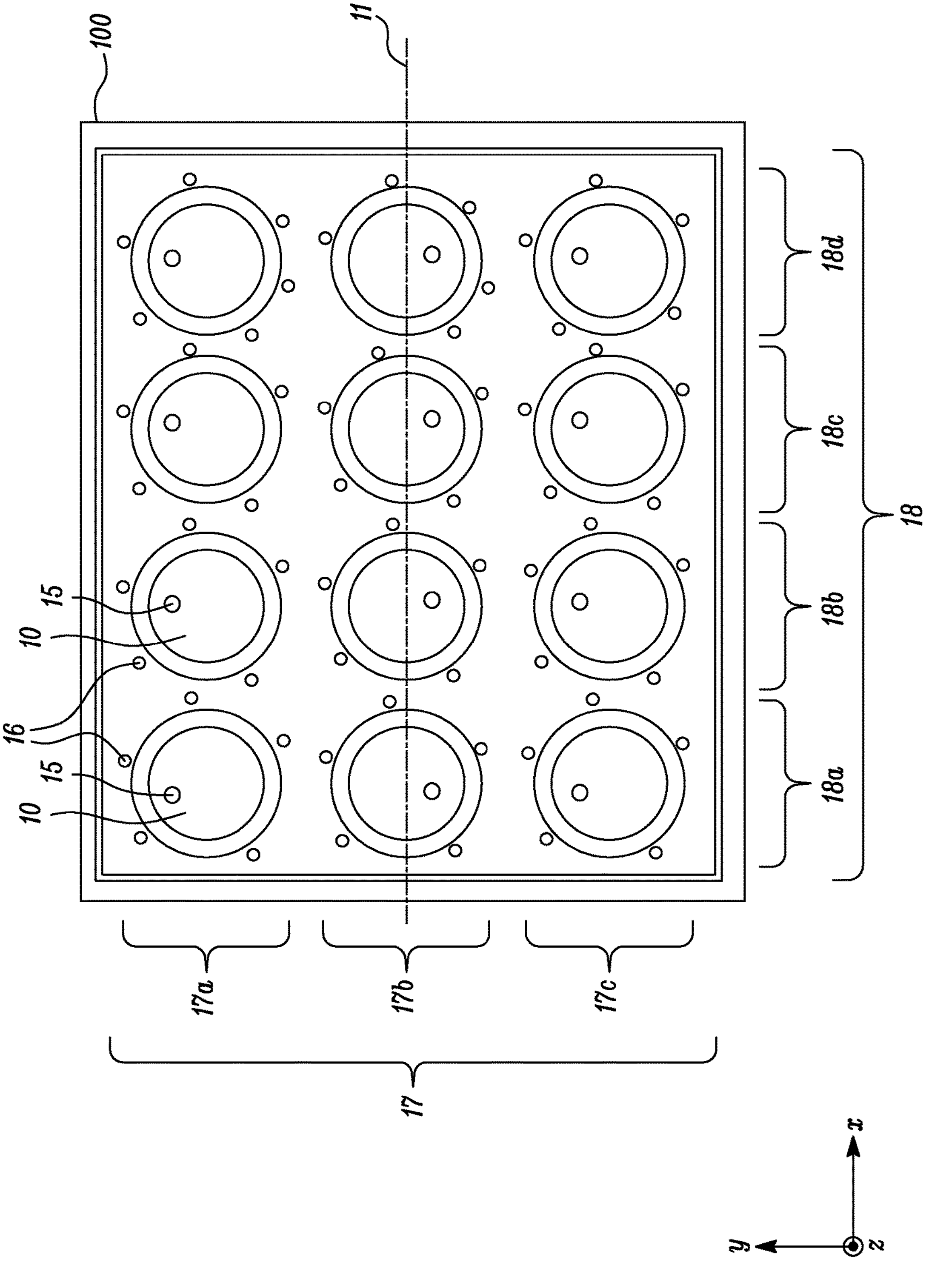
FIG. 1 illustrates a schematic top view of a phased array antenna, according to an embodiment of the present disclosure.

In the following description, reference is made to the accompanying figures that form a part thereof and in which various embodiments are shown by way of illustration. It is to be understood that other embodiments are contemplated and is made without departing from the scope or spirit of the present disclosure. The following detailed description, therefore, is not to be taken in a limiting sense.

In the following disclosure, the following definitions are adopted.

As used herein, all numbers should be considered modified by the term "about". As used herein, "a," "an," "the," "at least one," and "one or more" are used interchangeably.

As used herein as a modifier to a property or attribute, the term "generally", unless otherwise specifically defined, means that the property or attribute would be readily recognizable by a person of ordinary skill but without requiring absolute precision or a perfect match (e.g., within +/−20% for quantifiable properties).

The term "substantially", unless otherwise specifically defined, means to a high degree of approximation (e.g., within +/−10% for quantifiable properties) but again without requiring absolute precision or a perfect match.

The term "about", unless otherwise specifically defined, means to a high degree of approximation (e.g., within +/−5% for quantifiable properties) but again without requiring absolute precision or a perfect match.

As used herein, the terms "first" and "second" are used as identifiers. Therefore, such terms should not be construed as limiting of this disclosure. The terms "first" and "second" when used in conjunction with a feature or an element can be interchanged throughout the embodiments of this disclosure.

As used herein, "at least one of A and B" should be understood to mean "only A, only B, or both A and B".

As used herein, the term "between about", unless otherwise specifically defined, generally refers to an inclusive or a closed range. For example, if a parameter X is between about A and B, then $A \leq X \leq B$.

As used herein "gain" of an antenna is a measure of a maximum effectiveness with which the antenna can radiate a power delivered to it by a transmitter towards a target.

As used herein "antenna boresight" is an axis of maximum antenna gain or maximum radiated power of a directional antenna.

As used herein "scan range" is a 3 dB-coverage of an antenna.

As used herein "scan angle" is a specific angle from an antenna boresight.

As used herein, "loss tangent" quantifies a dielectric material's inherent dissipation of electromagnetic energy. Specifically, the loss tangent is a phase angle between resistive and reactive components of a system with permittivity.

As part of upgrading current mobile network infrastructure to provide $5^{th}$ Generation (5G) voice and data services, millimeter wave (mmWave) phased array antennas are nowadays being installed on existing Radio Access Network (RAN) cell sites. These cell sites typically support three sector antenna arrays, each of the three sector antenna arrays providing 120 degrees azimuthal coverage within the cell sites. In combination, the three sector antennas provide 360 degrees azimuthal coverage within the cell sites, thereby providing an omnidirectional coverage within the cell sites.

In order to provide a same network coverage within the existing RAN cell sites, highly directive mm Wave antennas are used. The highly directive mm Wave antennas include a large number of phased array's including multiple radiating elements. However, the highly directive mm Wave antennas may limit an azimuthal scan range of an overall antenna assembly due to beam broadening. The beam broadening may occur when the phased arrays broadcast further from an antenna boresight, i.e., at wider azimuthal scan angles. Therefore, the mmWave phased arrays may not provide 120 degrees coverage without a significant gain degradation at the wider azimuthal scan angles. This may lead to a decreased network coverage at seams (i.e., at wider azimuthal scan angles) of the cell sites. In turn, additional cell sites may be required to provide the same network coverage as the existing RAN cell sites.

The present disclosure provides an antenna assembly including a phased array antenna. The phased array antenna includes an array of spaced apart antenna elements arranged on a first horizontal surface and having a first axis of symmetry. The antenna assembly further includes a first lens disposed on the phased array antenna and substantially covering the antenna elements. The first lens includes a substantially planar first bottom surface facing and substantially parallel to the first horizontal surface. The first bottom surface and tops of the antenna elements define a gap therebetween. The first lens further includes a first top surface facing away from the first horizontal surface. The first lens includes a dielectric permittivity of between about 1.2 and about 2 at an operational frequency of the antenna assembly. The first lens further includes a loss tangent of between about 0.001 and about 0.005. For a second vertical plane substantially orthogonal to the first horizontal surface and including the first axis of symmetry, the antenna assembly steers a beam in the second vertical plane having a 3 decibel (dB) beam width W1 when steered along a first direction making an angle of less than about 10 degrees with a normal to the first horizontal surface and a 3 dB beam width W2 when steered along a second direction making an angle of greater than about 40 degrees with the normal, wherein W1 and W2 within 35% of each other.

The antenna assembly of the present disclosure including one or more lenses, such as the first lens, may limit the beam broadening without the gain degradation at the wider azimuthal scan angles. Specifically, the 3 dB beam width W1 steered along the first direction making the angle of less than about 10 degrees with a normal (i.e., the antenna boresight) and the 3 dB beam width W2 steered along the second direction making the angle of greater than about 40 degrees with the normal are within 35% of each other. Therefore, the antenna assembly of the present disclosure may extend the azimuthal scan range, which is typically limited due to the beam broadening. Further, additional cell sites may not be required to provide the same network coverage as the existing RAN cell sites.

Furthermore, the antenna assembly including the one or more lenses and a comparative antenna assembly that has a same construction as the antenna assembly except that it does not include the one or more lenses, may have substantially similar values of gain at various azimuthal scan angles.

Referring now to figures, FIG. 1 illustrates a schematic top view of a phased array antenna 100, according to an embodiment of the present disclosure.

The phased array antenna 100 defines mutually orthogonal x, y, and z-axes. The x and y-axes are in-plane axes of the phased array antenna 100, while the z-axis is a transverse axis disposed along a thickness of the phased array antenna 100. In other words, x and y-axes are along a plane of the phased array antenna 100 defining a x-y plane, and the z-axis is perpendicular to the plane of the phased array antenna 100.

The phased array antenna 100 includes an array of spaced apart antenna elements 10. Specifically, the antenna elements 10 are spaced apart along an x-y plane of the phased array antenna 100. In the illustrated embodiment of FIG. 1, the array of spaced apart antenna elements 10 includes 12 antenna elements 10. In some other embodiments, the array of spaced apart antenna elements 10 includes at least 16 antenna elements 10. In some embodiments, the array of spaced apart antenna elements 10 includes at least 64, at least 128, or at least 256 antenna elements 10. The array of spaced apart antenna elements 10 includes a first axis of symmetry 11. The antenna elements 10 are arranged in substantially parallel rows 17 and columns 18. The rows 17 extend substantially along the x-axis and the columns 18 extend substantially along the y-axis.

In the illustrated embodiment of FIG. 1, the rows 17 include three rows, specifically, rows 17*a*, 17*b*, 17*c* and the columns 18 include four columns, specifically, columns 18*a*, 18*b*, 18*c*, 18*d*. Therefore, in the illustrated embodiment of FIG. 1, the phased array antenna 100 includes twelve antenna elements 10. However, in some other embodiments, the array may include any number of the rows and columns 17, 18, as per desired application attributes.

In some embodiments, the array may include equal number of the rows and columns 17, 18. In other words, the array of spaced apart antenna elements 10 may be a regular array of antenna elements 10. In some embodiments, the regular array of antenna elements 10 may include a regular array of at least sixteen antenna elements 10. The sixteen antenna elements 10 may be arranged in an array of four substantially parallel rows 17 and four substantially parallel columns 18. In some other embodiments, the regular array includes a regular array of at least sixty four antenna elements 10, sixteen antenna elements 10 of which form the sixteen antenna elements 10 arranged in the array of four substantially parallel rows 17 and four substantially parallel columns 18. The regular array of antenna elements 10 may include a first axis of symmetry 11' (shown in FIG. 5). The first axis of symmetry 11' may be a diagonal axis of symmetry. The antennal elements may have any shape that may be desirable in an application. For example, the antenna elements may have polygonal shapes, such as square, rectangular, or hexagonal shapes, or curved shapes, such as circular or elliptical shapes.

The phased array antenna 100 may include one or more feed vias 15 to provide an electrical connection to a corresponding antenna element 10 by an electrical power supply (not shown). In some embodiments, all the antenna elements 10 are configured to operate at a same power level. In some other embodiments, at least two of the antenna elements 10 are configured to operate at different power levels. In other words, the power supply may be configured to provide electrical power of different magnitudes to the at least two antenna elements 10.

Figure 2:
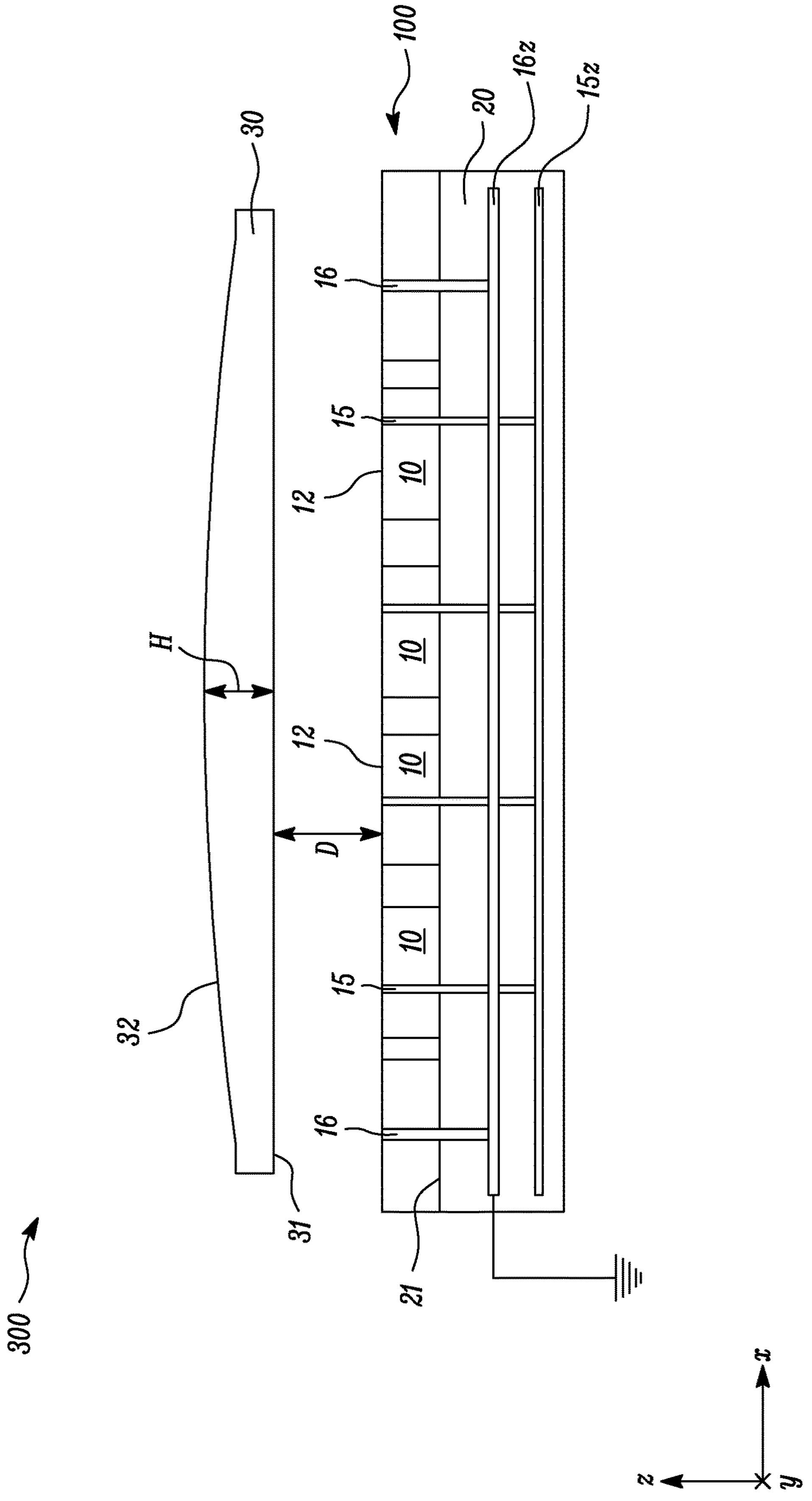
FIG. 2 illustrates a detailed schematic sectional view of an antenna assembly including the phased array antenna, according to an embodiment of the present disclosure.

The phased array antenna 100 may further include one or more ground vias 16 to connect a corresponding antenna element 10 to a common ground (shown in FIG. 2).

FIG. 2 illustrates a detailed schematic sectional view of an antenna assembly 300, according to an embodiment of the present disclosure. The antenna assembly 300 is configured to operate at an operational frequency having a free space wavelength W0. In some embodiments, the operational frequency of the antenna assembly 300 is between about 24 Gigahertz (GHz) and 100 GHz. In some embodiments, the operational frequency of the antenna assembly 300 is one or more of about 24 GHz, about 28 GHz, about 39 GHz, about 60 GHz, and about 95 GHz.

The antenna assembly 300 includes the phased array antenna 100. Specifically, the antenna assembly 300 includes the phased array antenna 100 including the array of the spaced apart antenna elements 10. The spaced apart antenna elements 10 are arranged on a first horizontal surface 21. In some embodiments, a spacing between the rows 17 (shown in FIG. 1) of the antenna elements 10 is between about 0.2 W0 and 0.35 W0. In some embodiments, a spacing between the columns 18 (shown in FIG. 1) of the antenna elements 10 is between about 0.2 W0 and 0.35 W0.

In some embodiments, the antenna assembly 300 includes the regular array of antenna elements 10. Specifically, in some embodiments, the phased array antenna 100 of the antenna assembly 300 may include the regular array of antenna elements 10. In some embodiments, the antenna assembly 300 includes the regular array of at least sixteen antenna elements 10. In some embodiments, the antenna assembly 300 includes the regular array of at least sixty four antenna elements 10.

In some embodiments, the first horizontal surface 21 can be interchangeably referred to as "the first major surface 21". In some embodiments, the regular array of antenna elements 10 are arranged on the first major surface 21 of a substrate 20. In some embodiments, the regular array of at least sixteen antenna elements 10 are arranged on the first major surface 21 of the substrate 20. In some embodiments, the regular array of at least sixty four antenna elements 10 are arranged on the first major surface 21 of the substrate 20.

In some embodiments, the first horizontal surface 21 is substantially planar. In the illustrated embodiment of FIG. 2, the first horizontal surface 21 is planar and is defined along the x-y plane of the phased array antenna 100.

In some embodiments, each of the antenna elements 10 includes a top 12. Specifically, in the illustrated embodiment of FIG. 2, the tops 12 of the antenna elements 10 are substantially planar.

The one or more feed vias 15 may include openings on the first horizontal surface 21 of the substrate 20. The one or more feed vias 15 may be drilled through the substrate 20 to provide the electrical connection between the corresponding antenna element 10 and the electrical power supply. The one or more feed vias 15 may include electrical connectors. Each electrical connector may be electrically connected to a bus 15*z* electrically coupled to the power supply.

The one or more ground vias 16 may include openings on the first horizontal surface 21 of the substrate 20. The one or more ground vias 16 may be drilled through the substrate 20. The one or more ground vias 16 may include electrical connectors. Each electrical connector of the ground vias 16 may be electrically connected to a bus 16*z* that is electrically coupled to the common ground.

The antenna assembly 300 further includes one or more lenses 30. In the illustrated embodiment of FIG. 2, the one or more lenses 30 is a single lens covering the regular array of antenna elements 10. Specifically, the one or more lenses 30 includes a first lens 30. The one or more lenses 30 may be interchangeably referred to as "the first lens 30". The first lens 30 is disposed on the phased array antenna 100 and substantially covers the antenna elements 10. Specifically, the first lens 30 is disposed on and substantially covers the array of antenna elements 10. The first lens 30 may be interchangeably referred to as "the beam shaping element 30". Therefore, the beam shaping element 30 is disposed on and substantially covers the regular array 12 of antenna elements 10. In some embodiments, the beam shaping element 30 is disposed on and substantially covers the regular array of antenna elements 10. In some embodiments, the beam shaping element 30 is disposed on and substantially covers the regular array of at least sixteen antenna elements 10. In some embodiments, the first lens 30 is a solid lens.

The first lens 30 includes a substantially planar first bottom surface 31 facing and substantially parallel to the first horizontal surface 21. The first lens 30 and the antenna elements 10 define a gap D therebetween. Specifically, the first bottom surface 31 and the tops 12 of the antenna elements 10 defines a gap D therebetween. In some embodiments, the beam shaping element 30 and the regular array of antenna elements 10 define the gap D therebetween. In some embodiments, the beam shaping element 30 and the sixteen antenna elements 10 define the gap D therebetween.

In some embodiments, the gap D may be a substantially equal distance between the first bottom surface 31 of the first lens 30 and the tops 12 of antenna elements 10. In other words, the first bottom surface 31 may be substantially equidistant from the top 12 of each of the antenna elements 10. In such embodiments, the first bottom surface 31 may be substantially parallel to the first horizontal surface 21. In some embodiments, the gap D is equal to or greater than about 1.5 millimeters (mm) and less than or equal to about 5 mm, i.e., 1.5 mm≤D≤5 mm. In some embodiments, the gap D is equal to or greater than about 2 mm and less than or equal to about 3 mm, i.e., 2 mm≤D≤3 mm. In some embodiments, 1.75 mm≤D≤4.5 mm, 2 mm≤D≤3 mm, or 2 mm≤D≤4 mm. In some embodiments, the gap D is a function of the free space wavelength W0. In some embodiments, the gap D is greater than or equal to about 1.5 W0 and less than or equal to about 5 W0, i.e., 1.5 W0≤D≤5 W0. In some embodiments, 1.75 W0≤D≤4.5 W0, or 2 W0≤D≤4 W0. In some embodiments, 0.1 W0≤D≤W0, or 0.2 W0≤D≤0.9 W0, or 0.2 W0≤D≤0.8 W0, or 0.2 W0≤D≤0.7 W0, or 0.2 W0≤D≤0.6 W0, or 0.2 W0≤D≤0.5 W0.

The first lens 30 further includes a first top surface 32 facing away from the first horizontal surface 21. In some embodiments, a portion of the first top surface 32 may be curved. In some embodiments, the first lens 30 is a spherical lens. In some embodiments, the first top surface 32 of the first lens 30 is curved and has a best-fit spherical radius of curvature R. In some embodiments, the first top surface 32 is curved, such that in at least one cross-section orthogonal to the planar first bottom surface 31, the first top surface 32 has a best-fit radius of curvature R. The radius of curvature R is greater than or equal to about 50 mm and less than or equal to about 75 mm, i.e., 50 mm≤R≤75 mm. In some embodiments, 55 mm≤R≤70 mm, 60 mm≤R≤70 mm, or 62 mm≤R≤66 mm. In some embodiments, the best-fit radius of curvature R of the first top surface 32 can be determined using conventional least squares fitting techniques. In some embodiments, the best-fit radius of curvature R is a function of the free space wavelength W0. In some embodiments, the best-fit radius of curvature R is greater than or equal to 50 W0 and less than or equal to 75 W0, i.e., 50 W0≤R≤75 W0. In some embodiments, 55 W0≤R≤70 W0, 60 W0≤R≤70 W0, or 62 W0≤R≤66 W0.

In some embodiments, the first lens 30 has a height H. The height H may be substantially along the z-axis. The height H may correspond to a maximum distance between the first bottom surface 31 and the first top surface 32. In some embodiments, the height H of the first lens 30 is greater than or equal to about 10 mm and less than or equal to about 30 mm, i.e., 10 mm≤H≤30 mm. In some embodiments, 15 mm≤H≤25 mm, or 20 mm≤H≤25 mm.

The first lens 30 includes a dielectric permittivity of between about 1.2 and about 2 at the operational frequency of the antenna assembly 300. In some embodiments, the first lens 30 includes the dielectric permittivity of between about 1.3 and about 1.8, between about 1.4 and about 1.6, or between about 1.4 and about 1.55 at the operational frequency of the antenna assembly 300. In some embodiments, the beam shaping element 30 has the dielectric permittivity of between about 1.2 and about 2 at a frequency of about 28 GHz. In some embodiments, the beam shaping element 30 has the dielectric permittivity of between about 1.3 and about 1.8, between about 1.4 and about 1.6, or between about 1.4 and about 1.55 at the frequency of about 28 GHz. In some embodiments, the dielectric permittivity of the first lens 30 is substantially constant across the first lens 30. In some other embodiments, the dielectric permittivity of the first lens 30 varies across the first lens 30. Further, in some embodiments, the dielectric permittivity of the first lens 30 is smaller near the first bottom surface 31 and greater near the first top surface 32. A lower dielectric permittivity of the first lens 30 may provide a low gain reduction. In other words, a gain of the antenna assembly may not be negatively affected due to the first lens 30.

The first lens 30 further includes a loss tangent of between about 0.001 and about 0.005. In some embodiments, the first lens includes the loss tangent of between about 0.002 and about 0.004, or between about 0.0025 and about 0.004.

Figure 3:
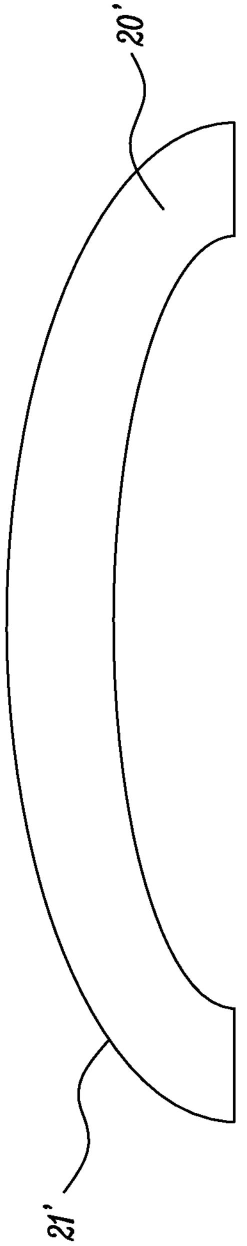
FIG. 3 illustrates a schematic sectional view of a substrate of the phased array antenna, according to another embodiment of the present disclosure.

FIG. 3 illustrates a schematic sectional view of a substrate 20', according to another embodiment of the present disclosure. The substrate 20' may be substantially similar to the substrate 20 (shown in FIG. 2). However, the substrate 20' includes a first horizontal surface 21'. In some embodiments, the first horizontal surface 21' can be interchangeably referred to as "the first major surface 21'". In some embodiments, the first horizontal surface 21' is non-planar. In the illustrated embodiment of FIG. 3, the first horizontal surface 21' of the substrate 20' is curved. Specifically, the first horizontal surface 21' has a substantially convex cross-sectional shape.

Figure 4A:
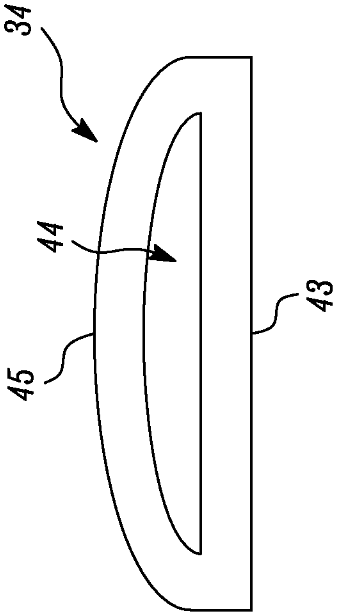
FIG. 4A illustrates a schematic sectional view of a first lens of the antenna assembly, according to an embodiment of the present disclosure.

FIG. 4A illustrates a schematic sectional view of a first lens 34, according to another embodiment of the present disclosure. The first lens 34 may be substantially similar to the first lens 30 (shown in FIG. 2). However, the first lens 34 is a hollow lens. In some embodiments, the first lens 34 includes a first bottom surface 43 and a curved first top surface 45. Further, in some embodiments, the first lens 34 defines a hollow cavity 44. The hollow cavity 44 may include an evacuated space, or may include a gas or a gas mixture, such as air. In some embodiments, the first lens 34 may be disposed in the antenna assembly 300 (shown in FIG. 2) such that the curved first top surface 45 faces away from the first horizontal surface 21.

Figure 4B:
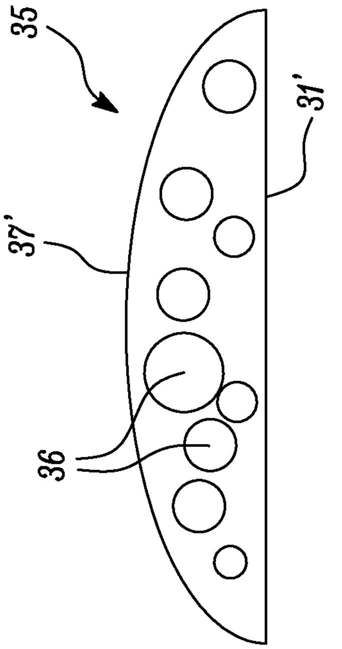
FIG. 4B illustrates a schematic sectional view of a first lens of the antenna assembly, according to another embodiment of the present disclosure.

FIG. 4B illustrates a schematic sectional view of a first lens 35, according to another embodiment of the present disclosure. The first lens 35 may be substantially similar to the first lens 30 (shown in FIG. 2). However, the first lens 35 includes a plurality of voids 36. The plurality of voids 36 may direct any heat generated by the antenna assembly 300 (shown in FIG. 2) away from the antenna elements 10 (shown in FIG. 2). In some embodiments, the first lens 35 includes a first bottom surface 31' and a first top surface 37' opposite the first bottom surface 31'. In some embodiments, the first bottom surface 31' is substantially planar and the first top surface 37' is non-planar. In some embodiments, the plurality of voids 36 may be introduced into the first lens 35 during fabrication of the first lens 35. In the illustrated embodiment of FIG. 4B, the voids 36 are substantially spherical voids. In some embodiments, the first lens 35 may be disposed in the antenna assembly 300 such that the first top surface 37' faces away from the first horizontal surface 21 (shown in FIG. 2).

Figure 4C:
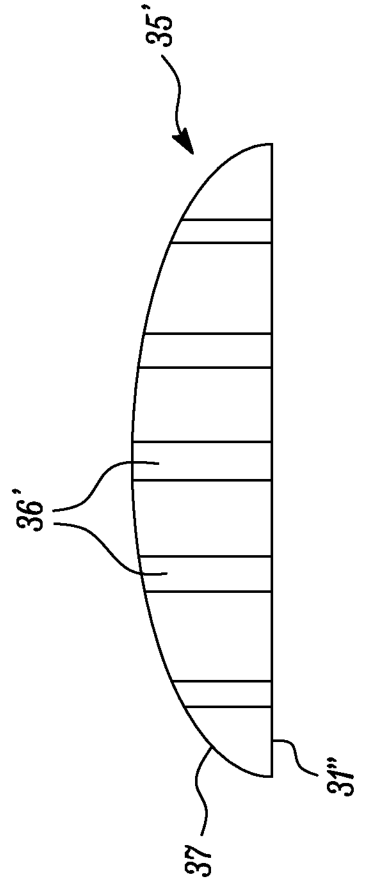
FIG. 4C illustrate a schematic sectional view of a first lens of the antenna assembly, according to yet another embodiment of the present disclosure.

FIG. 4C illustrates a schematic sectional view of a first lens 35', according to another embodiment of the present disclosure. The first lens 35' may be substantially similar to the first lens 30 (shown in FIG. 2). However, the first lens 35' includes a plurality of generally columnar voids 36' extending from a first bottom surface 31" to a first top surface 37 for directing any heat generated by the antenna assembly 300 away from the antenna elements 10. In some embodiments, the first bottom surface 31" is substantially planar and the first top surface 37 is non-planar. In the illustrated embodiment of FIG. 4C, the first top surface 37 is curved. In some embodiments, the first lens 35' may be disposed in the antenna assembly 300 such that the first top surface 37 faces away from the first horizontal surface 21 (shown in FIG. 2).

Figure 5:
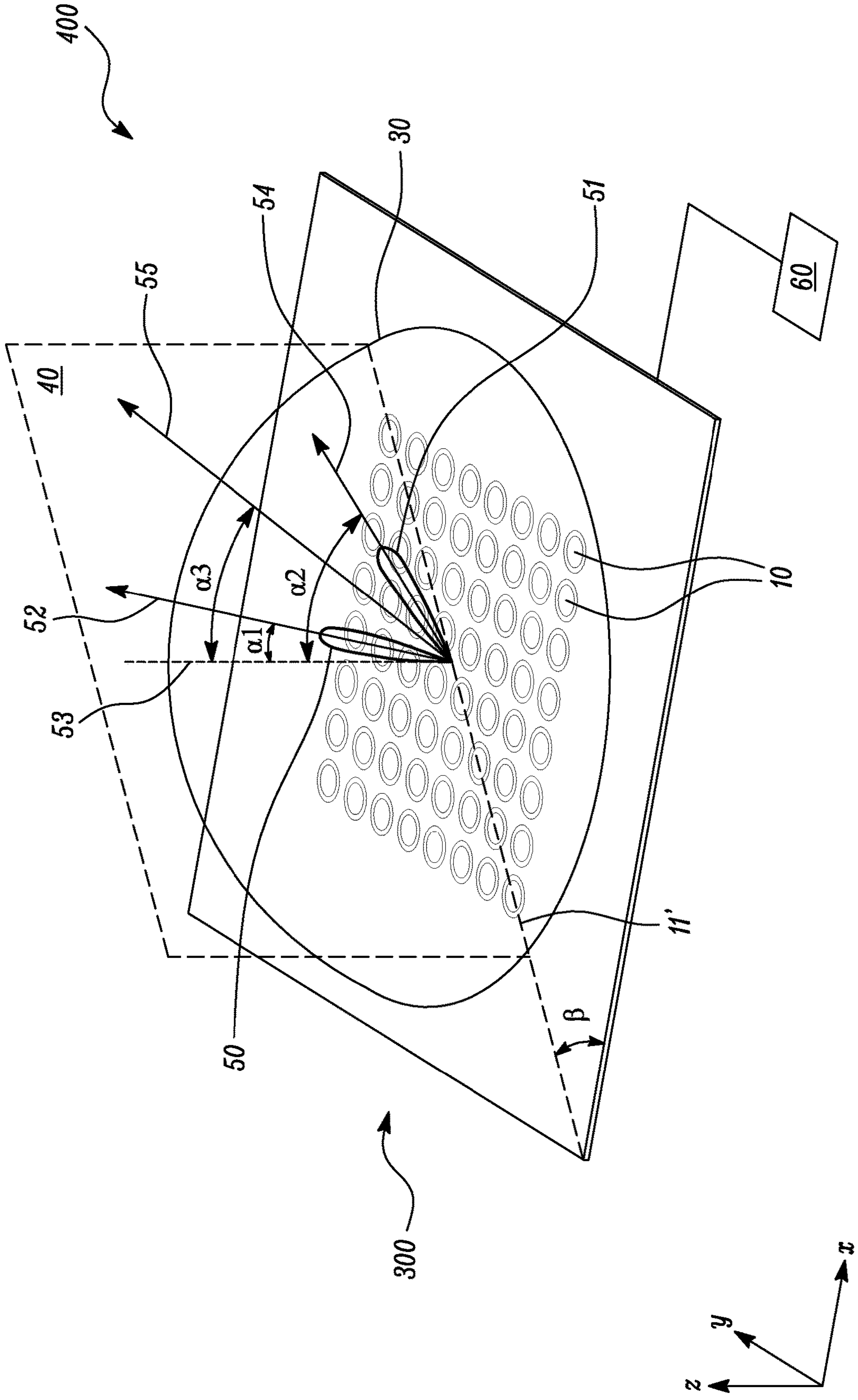
FIG. 5 illustrates a schematic diagram of a communication system including the antenna assembly, according to an embodiment of the present disclosure.

FIG. 5 illustrates a schematic diagram of a communication system 400, according to an embodiment of the present disclosure. In some embodiments, the communication system 400 includes the antenna assembly 300 of FIG. 2. In the illustrated embodiment of FIG. 5, the array of spaced apart antenna elements 10 is the regular array and includes the axis of symmetry 11'. The regular array includes sixty four antenna elements 10 arranged along the rows 17 (shown in FIG. 1) and the columns 18 (shown in FIG. 1). The communication system 400 further includes a control apparatus 60 coupled to, and energizing the antenna elements 10.

Referring now to FIGS. 2 and 5, the array of antenna elements 10 define a second vertical plane 40 substantially orthogonal to the first horizontal surface 21. In some embodiments, the second vertical plane 40 is a plane of symmetry for the array of antenna elements 10, and may be interchangeably referred to as "the plane of symmetry 40". In some embodiments, the second vertical plane 40 is a diagonal plane of symmetry, and may be interchangeably referred to as the "diagonal plane of symmetry 40". Therefore, in other words, the plane of symmetry 40 is substantially orthogonal to the first major surface 21. The second vertical plane 40 includes the first axis of symmetry 11'. In some embodiments, the second vertical plane 40 may include the first axis of symmetry 11. As illustrated in FIG. 5, the array of antenna elements 10 are arranged symmetrically with respect to the first axis of symmetry 11'.

In the illustrated embodiment of FIG. 5, the array of antenna elements 10 defines the diagonal plane of symmetry 40 substantially orthogonal to the first major surface 21 and making an angle β of between about 40 degrees and about 50 degrees with the rows 17 (shown in FIG. 1) of the antenna elements 10.

Figure 6:
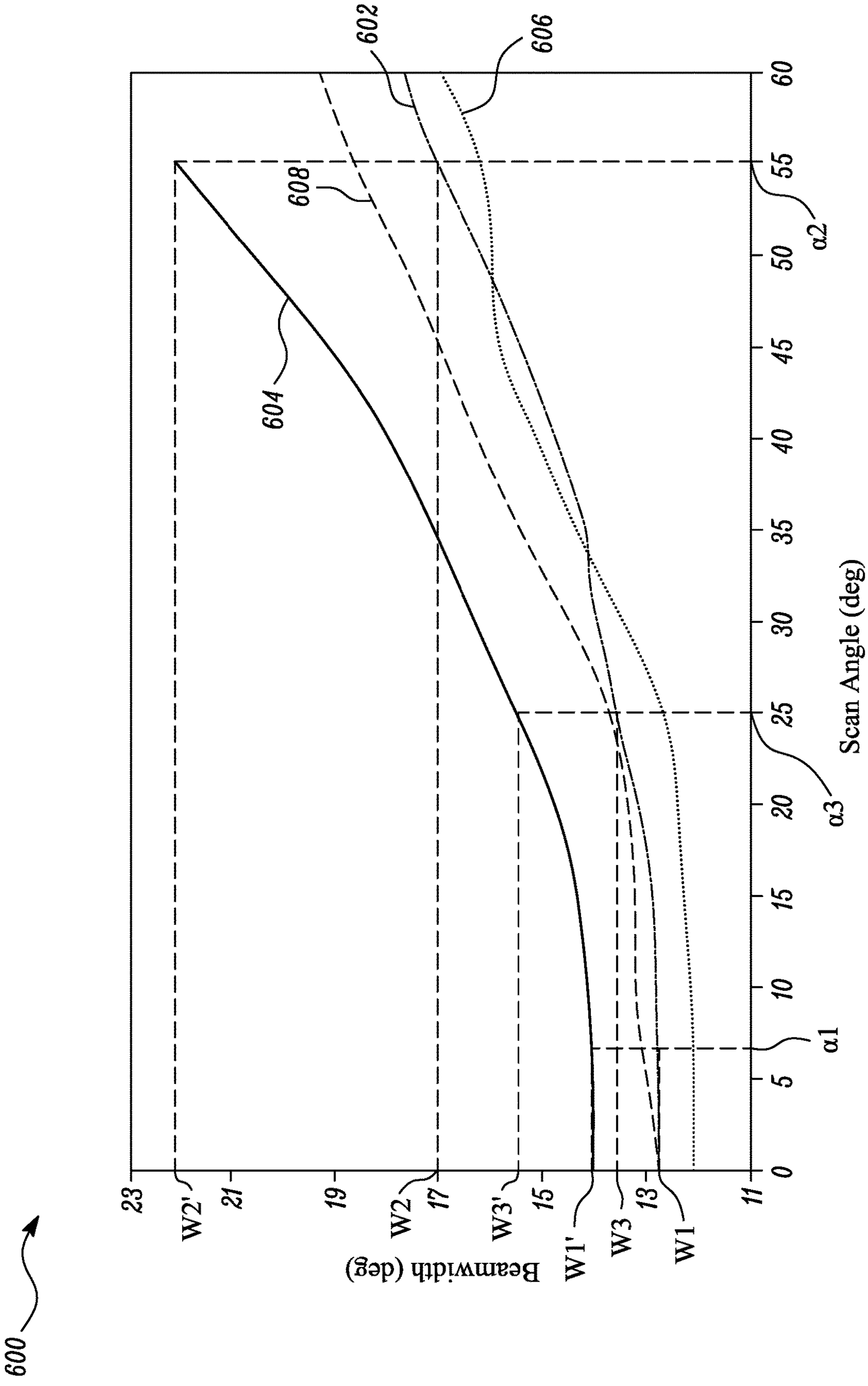
FIG. 6 illustrates a graph depicting scan angle versus 3 dB beamwidth of the antenna assembly of FIGS. 1 and 5 having different gaps, and a comparative antenna assembly, according to an embodiment of the present disclosure.

FIG. 6 illustrates a graph 600 depicting scan angle versus 3 dB beamwidth of the antenna assembly 300 (shown in FIG. 2), according to an embodiment of the present disclosure. The scan angle is expressed in degrees (deg) in the abscissa. The 3 dB beamwidth is expressed in degrees (deg) in the ordinate. The graph 600 includes curves 602, 604, 606, 608. The curve 602 depicts a scan angle versus a 3 dB beamwidth of the antenna assembly 300 with the gap D of 2.65 mm. The curve 604 depicts a scan angle versus a 3 dB beamwidth of an antenna assembly having a same construction as the antenna assembly 300 except that it does not include the first lens 30 (shown in FIG. 2). The curve 606 depicts a scan angle versus a 3 dB beamwidth of the antenna assembly 300 having the gap D of about 6 mm, and the curve 608 depicts a scan angle versus a 3 dB beamwidth of the antenna assembly 300 having gap D of about 0 mm.

Referring to FIGS. 5 and 6, for the second vertical plane 40 substantially orthogonal to the first horizontal surface 21 and including the first axis of symmetry 11', the antenna assembly 300 steers a beam 50 in the second vertical plane 40 having a 3 dB beamwidth W1 when steered along a first direction 52 making an angle α1 of less than about 10 degrees with a normal 53 to the first horizontal surface 21. Further, for the second vertical plane 40, the antenna assembly 300 steers a beam 51 in the second vertical plane 40 having a 3 dB beamwidth W2 when steered along a second direction 54 making an angle α2 of greater than about 40 degrees with the normal 53. Further, the control apparatus 60 coupled to the antenna elements 10 steers the beam 50 in the second vertical plane 40 or the diagonal plane of symmetry 40.

As depicted by the curve 602, the 3 dB beamwidth W1 of the beam 50, when steered along the first direction 52 making the angle α1 of less than about 10 degrees with the normal 53 to the first horizontal surface 21, is about 12.8 degrees. In the graph 600, the angle α1 corresponds to a scan angle of about 7 degrees. Further, the 3 dB beamwidth W2 of the beam 51, when steered along the second direction 54 making the angle α2 of greater than about 40 degrees with the normal 53, is about 17 degrees. In the graph 600, the angle α2 corresponds to a scan angle of about 55 degrees. As is apparent from the curve 602, W1 and W2 within 35% of each other.

Referring now to curves 602, 604, for the angle α1, the beam steered by the antenna assembly 300 that has the same construction except that it does not include the first lens 30, in the second vertical plane 40 along the first direction 52, has a 3 dB beam width W1''. Further, for the angle α2, a beam steered by the antenna assembly 300 that has a same construction except that it does not include the first lens 30, in the second vertical plane 40 along the second direction 54, has a 3 dB beam width W2'. As is apparent from the curves 602, 604, W1' is greater than W1 and W2' is substantially greater than W2.

Further, for at least one first angle α3 between about 4 degrees and about 60 degrees, a beam steered by the antenna assembly 300 in the second vertical plane 40 along a direction 55 making the first angle α3 with the normal 53 to the first horizontal surface 21 has a 3 dB beam width W3. W3 is about 13.5 degrees. The first angle α3 is about 25 degrees.

Further, for the at least one first angle α3, the beam steered by the antenna assembly that has the same construction except that it does not include the first lens 30, in the second vertical plane 40 along the direction 55 making the first angle α3 with the normal 53 to the first horizontal surface 21, has a 3 dB beam width W3'. W3' is about 15.5 degrees. The first angle α3 is about 25 degrees.

Therefore, as is apparent from the graph 600, the beam steered by the antenna assembly 300 in the second vertical plane 40 along the direction 55 making the first angle α3 with the normal 53 to the first horizontal surface 21 has the 3 dB beam width W3 that is at least 0.5% less as compared to the 3 dB beam width W3' of the antenna assembly that has the same construction except that it does not include the first lens 30. In some embodiments, for the at least one first angle α3 between about 4 degrees and about 60 degrees, the beam steered by the antenna assembly 300 in the second vertical plane 40 along the direction 55 making the first angle α3 with the normal 53 to the first horizontal surface 21 has the 3 dB beam width W3 that is at least 0.75%, at least 1%, at least 1.25%, at least 1.5%, at least 1.75%, or at least 2% less as compared to the 3 dB beam width W3' of the antenna assembly that has the same construction except that it does not include the first lens 30. In some embodiments, for each first angle α3 between about 4 degrees and about 60 degrees, the beam steered by the antenna assembly 300 in the second vertical plane 40 along the direction 55 making the first angle α3 with the normal 53 to the first horizontal surface 21 has the 3 dB beam width W3 that is at least 0.5% less as compared to the 3 dB beam width W3' of the antenna assembly that has the same construction except that it does not include the first lens 30. In some embodiments, for each first angle α3 between about 4 degrees and about 60 degrees, the beam steered by the antenna assembly 300 in the second vertical plane 40 along the direction 55 making the first angle α3 with the normal 53 to the first horizontal surface 21 has the 3 dB beam width W3 that is at least 0.75%, at least 1%, at least 1.25%, at least 1.5%, at least 1.75%, or at least 2% less as compared to the 3 dB beam width W3' of the antenna assembly that has the same construction except that it does not include the first lens 30.

In some embodiments, for each angle between about 40 degrees and about 60 degrees, a beam steered by the antenna assembly 300 in the second vertical plane 40 along the direction 55 making the angle between about 40 degrees and about 60 degrees with the normal 53 to the first horizontal surface 21 has the 3 dB beam width W3 that is at least 1.5% less as compared to the 3 dB beam width W3' of the antenna assembly that has the same construction except that it does not include the first lens 30. In some embodiments, for each angle between about 40 degrees and about 60 degrees, the beam steered by the antenna assembly 300 in the second vertical plane 40 along the direction 55 making the angle between about 40 degrees and about 60 degrees with the normal 53 to the first horizontal surface 21 has the 3 dB beam width W3 that is at least 1.75%, or at least 2% less as compared to the 3 dB beam width W3' of the antenna assembly that has the same construction except that it does not include the first lens 30.

Therefore, the antenna assembly 300 including the first lens 30 may substantially limit beam broadening at large scan angles (e.g., angles between about 40 degrees to 60 degrees) compared to the antenna assembly that has the same construction except that it does not include the first lens 30. Therefore, the antenna assembly 300 may have an extended scan range, which is typically limited due to the beam broadening in conventional antenna assemblies.

As depicted by the curves 602, 606, 608, for each angle between about 0 degree and about 60 degrees, a 3 dB beam width of a beam steered by the antenna assembly 300 having the gap D of about 6 mm between the antenna elements 10 and the bottom surface 31 and a 3 dB beam width of a beam steered by the antenna assembly 300 having the gap D of 0 mm between the antenna elements 10 and the bottom surface 31, remain substantially similar to the 3 dB beam width of the beam steered by the antenna assembly 300 having the gap D of 2.65 mm between the antenna elements 10 and the bottom surface 31.

Figure 7:
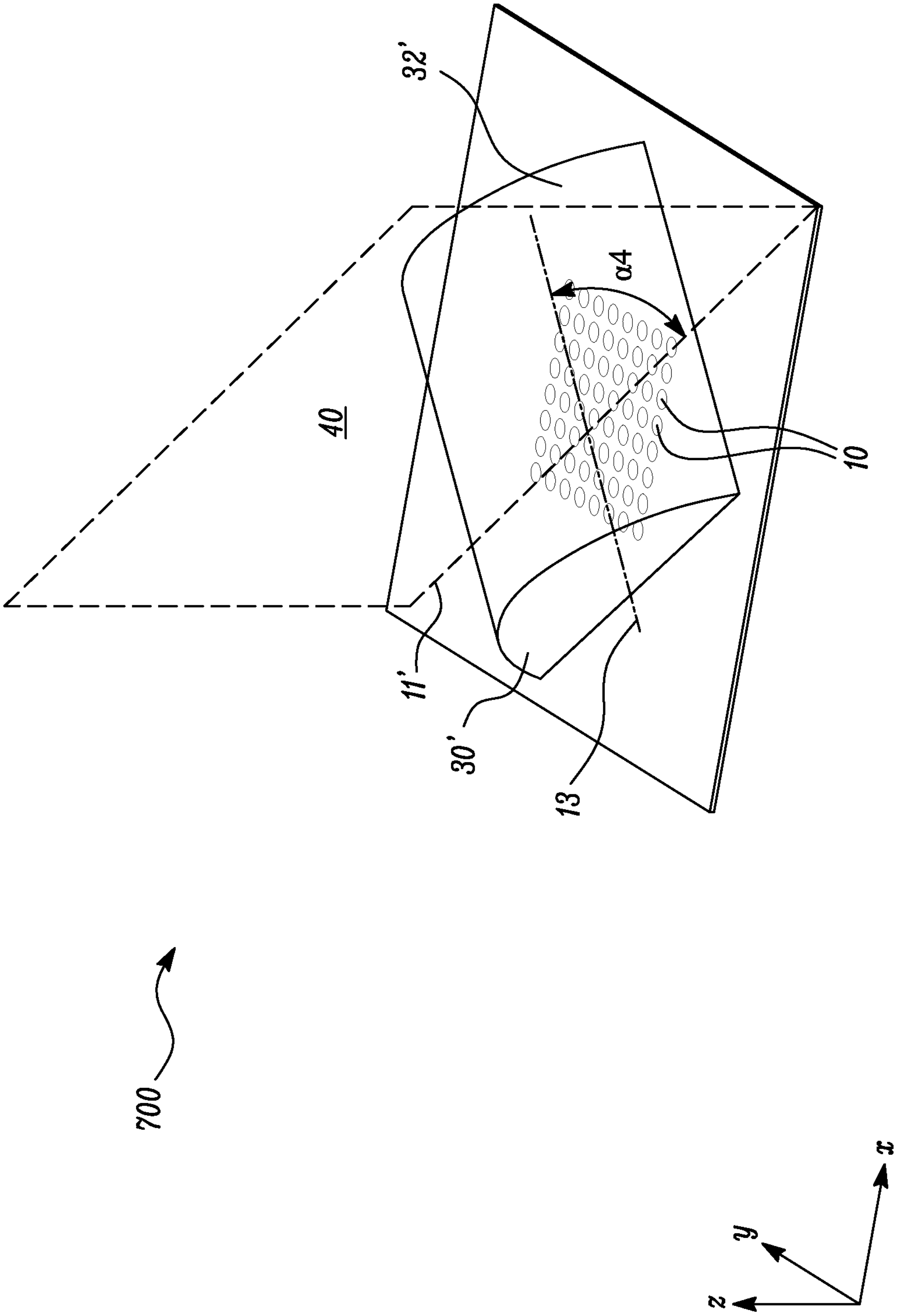
FIG. 7 illustrates a schematic diagram of an antenna assembly, according to another embodiment of the present disclosure.

FIG. 7 illustrates a schematic diagram of an antenna assembly 700, according to another embodiment of the present disclosure. The antenna assembly 700 is substantially similar to the antenna assembly 300 of FIG. 2. Common components between the antenna assembly 700 and the antenna assembly 300 are referenced by the same reference numerals. However, the antenna assembly 700 includes a first lens 30', where the first lens 30' is a cylindrical lens. Some elements of the antenna assembly 700 are not shown in FIG. 7 for illustrative purposes.

The first lens 30' includes a first top surface 32'. The first top surface 32' of the first lens 30' is a partial cylindrical surface centered on a first lens axis 13. In some embodiments, the first lens axis 13 makes an angle α4 of greater than about 50 degrees with the first axis of symmetry 11'. In some embodiments, the first lens axis 13 makes the angle α4 of greater than about 60 degrees, greater than about 70 degrees, greater than about 80 degrees, or greater than about 85 degrees with the first axis of symmetry 11'. In some embodiments, the first lens axis 13 is substantially orthogonal to the first axis of symmetry 11'. In the illustrated embodiment of FIG. 7, the angle α4 between the first lens axis 13 and the first axis of symmetry 11 is about 90 degrees.

Figure 8:
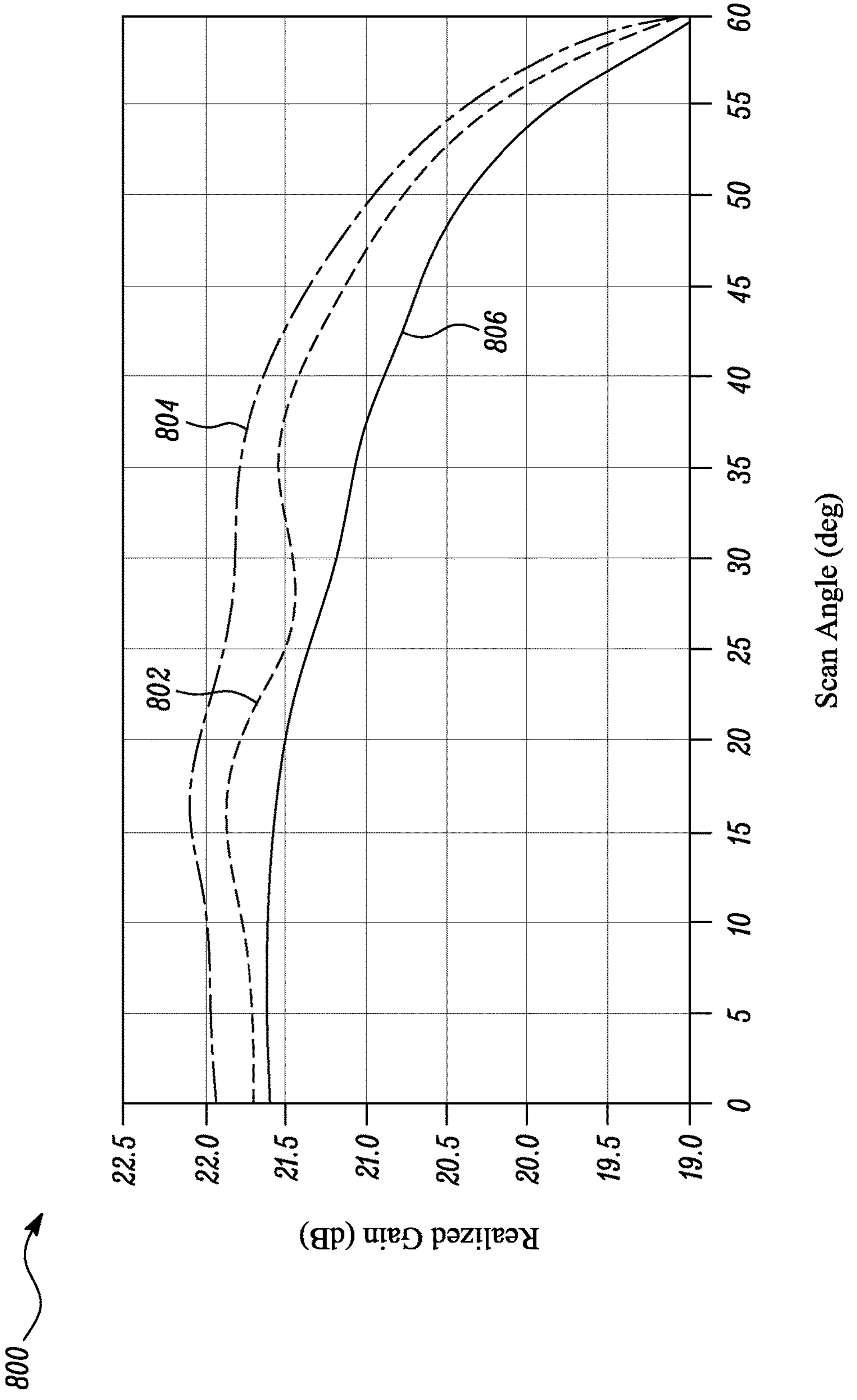
FIG. 8 illustrates a graph depicting scan angle versus realized gain of the antenna assembly of FIGS. 1 and 5, the antenna assembly of FIG. 7, and a comparative antenna assembly, according to an embodiment of the present disclosure.

FIG. 8 illustrates a graph 800 depicting a scan angle versus a realized gain of the antenna assembly 700 of FIG. 7 including the first lens 30', a scan angle versus a realized gain of the antenna assembly 300 of FIG. 5 including the first lens 30, and a scan angle versus a realized gain of an antenna assembly having a same construction and excluding the first lenses 30, 30', according to an embodiment of the present disclosure. The scan angle is expressed in degrees (deg) in the abscissa. The realized gain is expressed in decibels (dB) in the ordinate.

In the graph 800, the scan angle versus realized gain of the antenna assembly 700 including the first lens 30' is depicted by a curve 802, the scan angle versus realized gain of the antenna assembly 300 including the first lens 30 is depicted by a curve 804, and the scan angle versus realized gain of the antenna assembly having the same construction and excluding the first lenses 30, 30' is depicted by a curve 806.

As depicted by the curve 802, the realized gain of the antenna assembly 700 is about 21.7 dB when the scan angle is about 0 degree. Further, the realized gain of the antenna assembly 700 changes as the scan angle is increased. Specifically, the realized gain of the antenna assembly 700 decreases to about 20.2 dB when the scan angle is about 55 degrees.

As depicted by the curve 804, the realized gain of the antenna assembly 300 is about 21.95 dB when the scan angle is about 0 degree. Further, the realized gain of the antenna assembly 300 changes as the scan angle is increased. Specifically, the realized gain of the antenna assembly 300 decreases to about 20.4 dB when the scan angle is about 55 degrees.

As depicted by the curve 806, the realized gain of the antenna assembly having the same construction and excluding the first lenses 30, 30' is about 21.6 dB when the scan angle is about 0 degree. Further, the realized gain of the antenna assembly having the same construction and excluding the first lenses 30, 30' changes as the scan angle is increased. Specifically, the realized gain of the antenna assembly having the same construction and excluding the first lenses 30, 30' decreases to about 19.8 dB when the scan angle is about 55 degrees.

As is apparent from the graph 800, the realized gain of the antenna assembly 700 (depicted by the curve 802) and the realized gain of the antenna assembly 300 (depicted by the curve 804) are both greater than the realized gain of the antenna assembly having the same construction and excluding the first lenses 30, 30' (depicted by the curve 806) at each scan angle from about 0 degree to about 55 degrees. Further, the realized gain of the antenna assembly 300 (depicted by the curve 804) is greater than the realized gain of the antenna assembly 700 (depicted by the curve 802) at each value of the scan angle from about 0 degree to about 55 degrees. Therefore, in some embodiments, the antenna assembly 300 including the first lens 30 may provide an improved gain as compared to the antenna assembly 700 including the first lens 30'. In other words, the antenna assembly 300 including the spherical lens may provide an improved gain as compared to the antenna assembly 700 including the cylindrical lens having the first lens axis 13 making the angle α4 of greater than about 50 degrees with the first axis of symmetry 11'.

Figure 9:
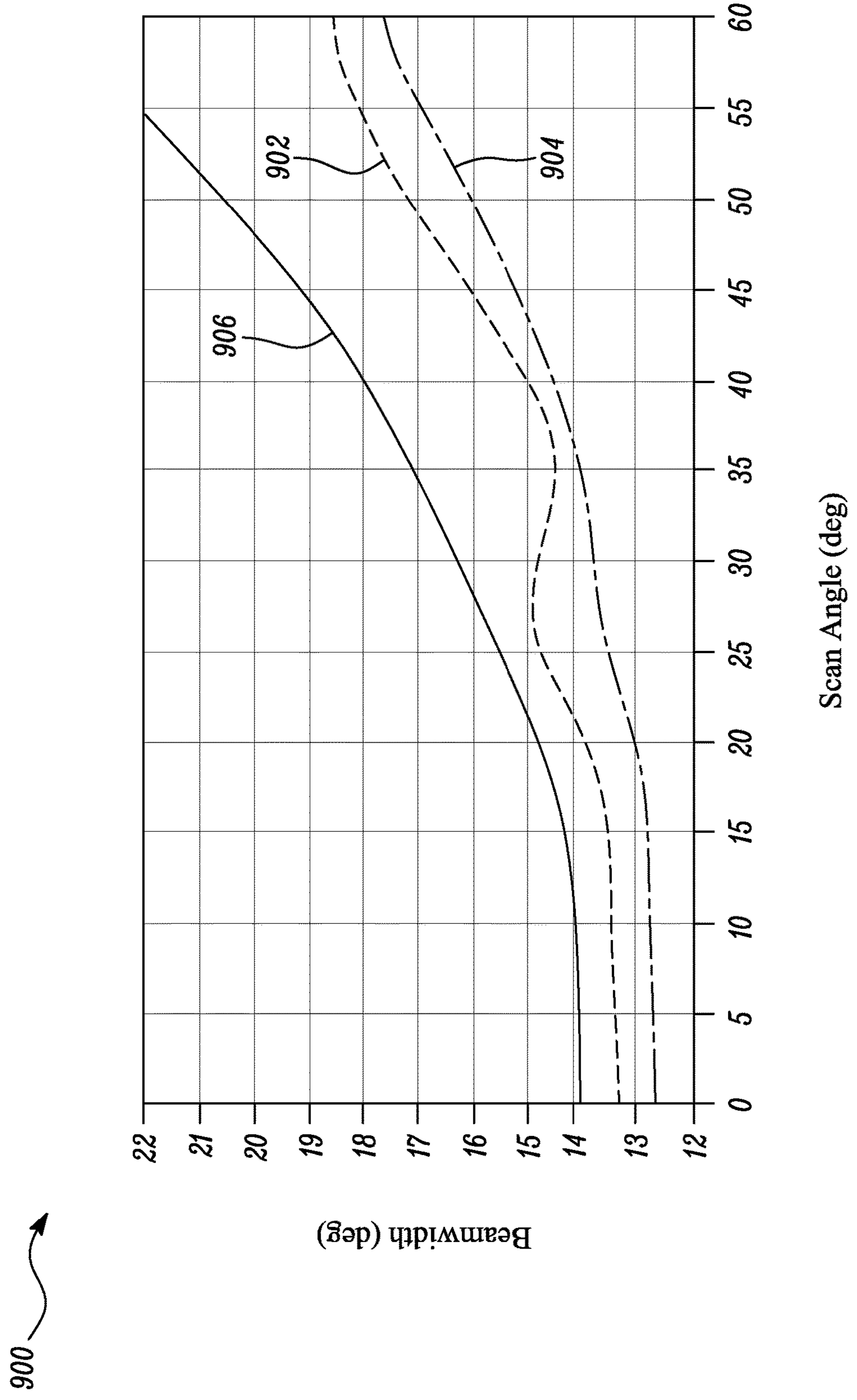
FIG. 9 illustrates a graph depicting scan angle versus 3 dB beamwidth of the antenna assembly of FIGS. 1 and 5, the antenna assembly of FIG. 7, and a comparative antenna assembly, according to an embodiment of the present disclosure.

FIG. 9 illustrates a graph 900 depicting scan angle versus 3 dB beamwidth of the antenna assembly 700 of FIG. 7 including the first lens 30', scan angle versus 3 dB beamwidth of the antenna assembly 300 of FIG. 5 including the first lens 30, and a scan angle versus 3 dB beamwidth of an antenna assembly having a same construction and excluding the first lenses 30, 30', according to an embodiment of the present disclosure. The scan angle is expressed in degrees (deg) in the abscissa. The 3 dB beamwidth is expressed in degrees (deg) in the ordinate.

In the graph 900, the scan angle versus 3 dB beamwidth of the antenna assembly 700 including the first lens 30' is depicted by a curve 902, the scan angle versus 3 dB beamwidth of the antenna assembly 300 including the first lens 30 is depicted by a curve 904, and the scan angle versus 3 dB beamwidth of the antenna assembly having the same construction and excluding the first lenses 30, 30' is depicted by a curve 906.

As depicted by the curve 902, the 3 dB beamwidth of the antenna assembly 700 including the first lens 30' is about 13.3 degrees when the scan angle is about 0 degree. Further, the 3 dB beamwidth of the antenna assembly 700 changes as the scan angle is increased. Specifically, the 3 dB beamwidth of the antenna assembly 700 increases to about 18 degrees when the scan angle is about 55 degrees.

As depicted by the curve 904, the 3 dB beamwidth of the antenna assembly 300 including the first lens 30 is about 12.8 degrees when the scan angle is about 0 degree. Further, the 3 dB beamwidth of the antenna assembly 300 changes as the scan angle is increased. Specifically, the 3 dB beamwidth of the antenna assembly 300 increases to about 17 degrees when the scan angle is about 55 degrees.

As depicted by the curve 906, the 3 dB beamwidth of the antenna assembly having the same construction and excluding the first lenses 30, 30' is about 13.95 degrees when the scan angle is about 0 degree. Further, the 3 dB beamwidth of the antenna assembly having the same construction and excluding the first lenses 30, 30' changes as the scan angle is increased. Specifically, the 3 dB beamwidth of the antenna assembly having the same construction and excluding the first lenses 30, 30' increases to about 22 degrees when the scan angle is about 55 degrees.

As is apparent from the graph 900, the 3 dB beamwidth of the antenna assembly 700 (depicted by the curve 902) and the 3 dB beamwidth of the antenna assembly 300 (depicted by the curve 904) are both less than the 3 dB beamwidth of the antenna assembly having the same construction and excluding the first lenses 30, 30' (depicted by the curve 906) at each scan angle from about 0 degree to about 55 degrees. Further, in some embodiments, the 3 dB beamwidth of the antenna assembly 300 (depicted by the curve 904) is less than the 3 dB beamwidth of the antenna assembly 700 (depicted by the curve 902) at each scan angle from about 0 degree to about 55 degrees. In other words, the antenna assembly 300 including the spherical lens may provide a better reduction in the beam broadening as compared to the antenna assembly 700 including the cylindrical lens having the first lens axis 13 making the angle α4 of greater than about 50 degrees with the first axis of symmetry 11'.

Figure 10:
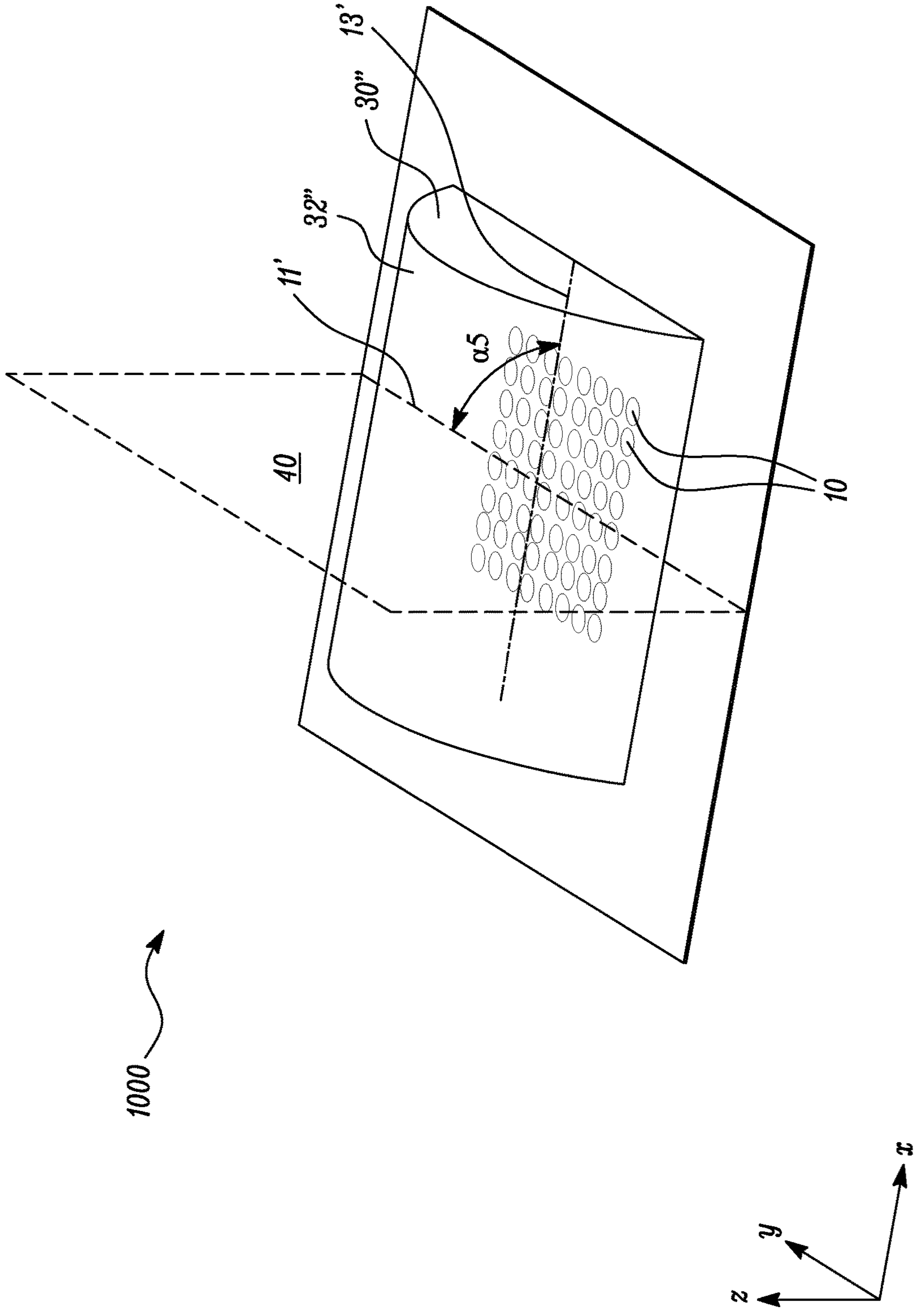
FIG. 10 illustrates a schematic diagram depicting an antenna assembly, according to another embodiment of the present disclosure.

FIG. 10 illustrates a schematic diagram of an antenna assembly 1000, according to an embodiment of the present disclosure. The antenna assembly 1000 is substantially similar to the antenna assembly 700 of FIG. 7. Common components between the antenna assembly 700 and the antenna assembly 1000 are referenced by the same reference numerals. However, the antenna assembly 1000 includes a first lens 30", where the first lens 30" is a cylindrical lens. Some elements of the antenna assembly 1000 are not shown in FIG. 10 for illustrative purposes.

The first lens 30" includes a first top surface 32". In some embodiments, the first top surface 32" of the first lens 30" is a partial cylindrical surface centered on a first lens axis 13'. In some embodiments, the first lens axis 13' makes an angle α5 of between about 60 degrees and about 120 degrees with the first axis of symmetry 11'. In some embodiments, the first lens axis 13' makes the angle α5 of between about 70 degrees and about 110 degrees, or between about 80 degrees and about 100 degrees with the first axis of symmetry 11'. In some embodiments, the first lens axis 13' may be substantially orthogonal to the first axis of symmetry 11'. In the illustrated embodiment of FIG. 10, the angle α5 between the first lens axis 13' and the first axis of symmetry 11' is about 90 degrees.

Figure 11:
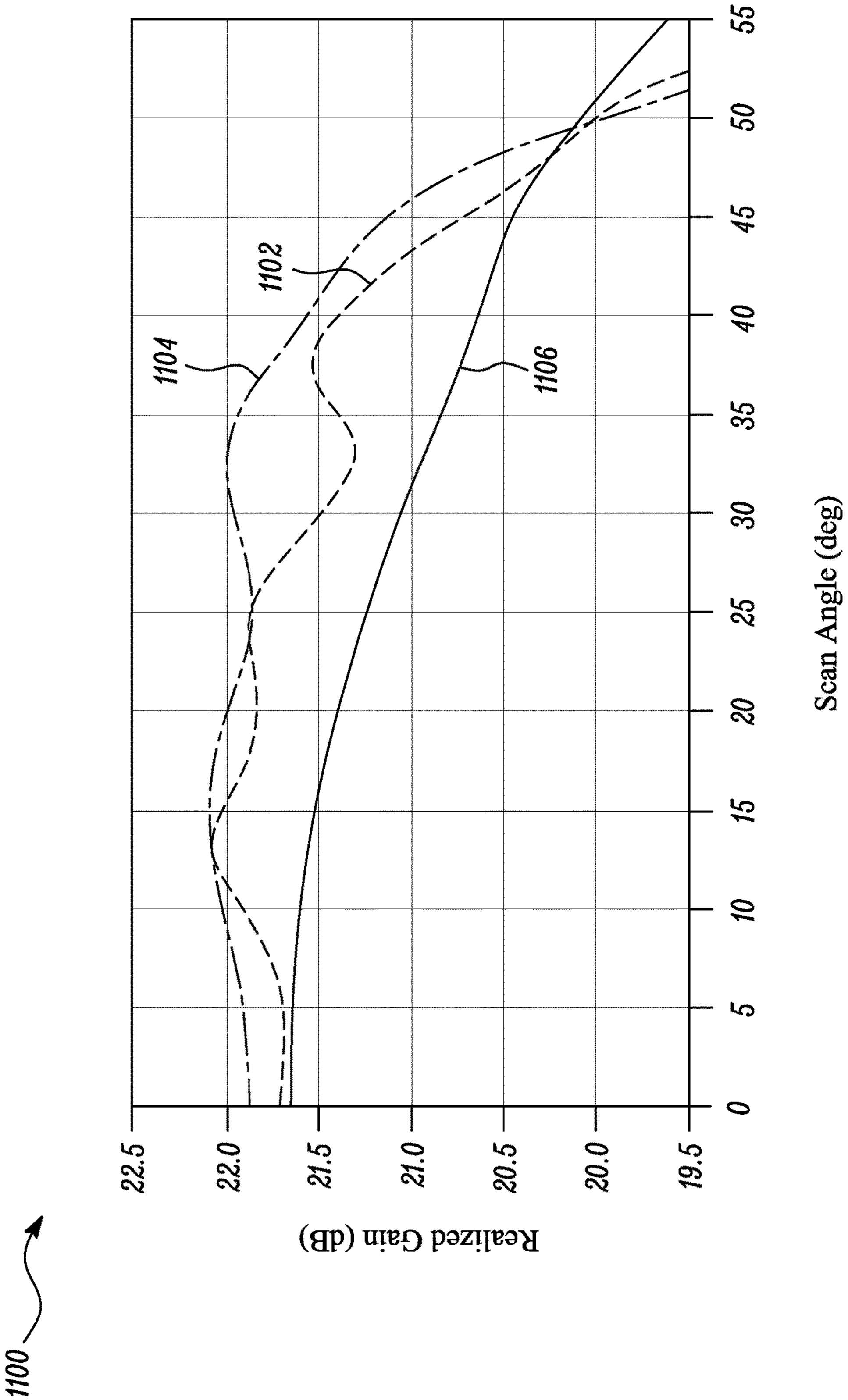
FIG. 11 illustrates a graph depicting scan angle versus realized gain of the antenna assembly of FIGS. 1 and 5, the antenna assembly of FIG. 10, and a comparative antenna assembly, according to an embodiment of the present disclosure.

FIG. 11 illustrates a graph 1100 depicting scan angle versus realized gain of the antenna assembly 1000 of FIG. 10 including the first lens 30", scan angle versus realized gain of the antenna assembly 300 of FIG. 5 including the first lens 30, and scan angle versus realized gain of an antenna assembly having a same construction and excluding the first lenses 30, 30" according to an embodiment of the present disclosure. The scan angle is expressed in degrees (deg) in the abscissa. The realized gain is expressed in decibels (dB) in the ordinate.

In the graph 1100, the scan angle versus realized gain of the antenna assembly 1000 is depicted by a curve 1102, the scan angle versus realized gain of the antenna assembly 300 is depicted by a curve 1104, and the scan angle versus realized gain of the antenna assembly having the same construction and excluding the first lenses 30, 30" is depicted by a curve 1106.

As depicted by the curve 1102, the realized gain of the antenna assembly 1000 is about 21.75 dB when the scan angle is about 0 degree. Further, the realized gain of the antenna assembly 1000 changes as the scan angle is increased. Specifically, the realized gain of the antenna assembly 1000 decreases to about 20 dB when the scan angle is about 50 degrees.

As depicted by the curve 1104, the realized gain of the antenna assembly 300 is about 21.9 dB, when the scan angle is about 0 degree. Further, the realized gain of the antenna assembly 300 changes as the scan angle is increased. Specifically, the realized gain of the antenna assembly 300 decreases to about 20 dB when the scan angle is about 50 degrees.

As depicted by the curve 1106, the realized gain of the antenna assembly having the same construction and excluding the first lenses 30, 30" is about 21.7 dB when the scan angle is about 0 degree. Further, the realized gain of the antenna assembly having the same construction and excluding the first lenses 30, 30" changes as the scan angle is increased. Specifically, the realized gain of the antenna assembly having the same construction and excluding the first lenses 30, 30" decreases to about 20.2 dB when the scan angle is about 50 degrees.

As is apparent from the graph 1100, the realized gain of the antenna assembly 1000 (depicted by the curve 1102) and the realized gain of the antenna assembly 300 (depicted by the curve 1104) are both greater than the realized gain of the antenna assembly having the same construction and excluding the first lenses 30, 30" (depicted by the curve 1106) at at least one value of the scan angle from about 0 degree to about 55 degrees. In the illustrated graph 1100, the realized gain of the antenna assembly 1000 (depicted by the curve 1102) and the realized gain of the antenna assembly 300 (depicted by the curve 1104) are both greater than the realized gain of the antenna assembly having the same construction and excluding the first lenses 30, 30" (depicted by the curve 1106) at each value of the scan angle from about 0 degree to about 45 degrees. Therefore, in some embodiments, each of the antenna assembly 300 and the antenna assembly 1000 may provide an improved gain at the scan angle ranging from about 0 degree to about 45 degrees as compared to the antenna assembly having the same construction and excluding the first lenses 30, 30".

Figure 12:
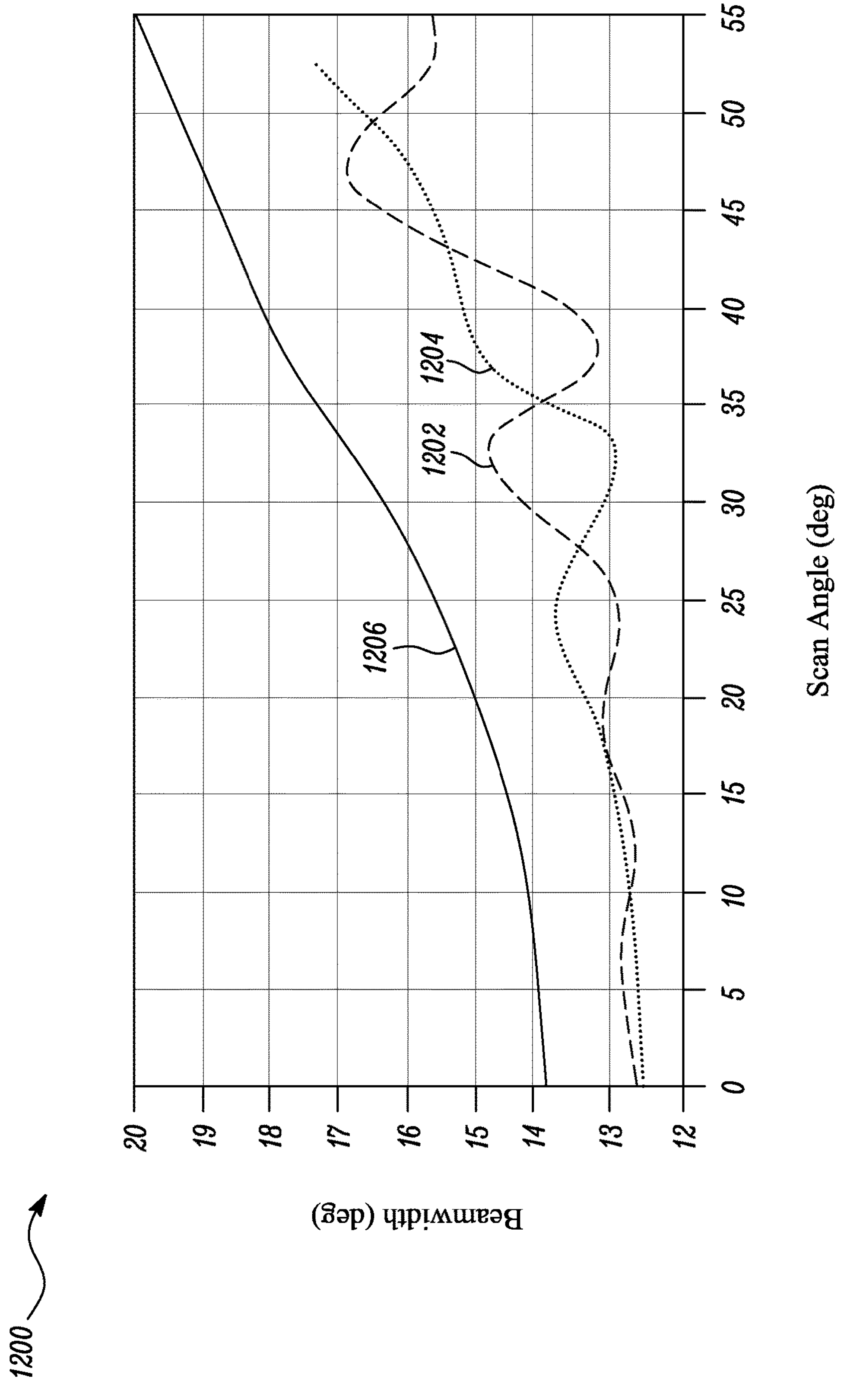
FIG. 12 illustrates a graph depicting scan angle versus a 3 dB beamwidth of the antenna assembly of FIGS. 1 and 5, the antenna assembly of FIG. 10, and a comparative antenna assembly, according to an embodiment of the present disclosure.

FIG. 12 illustrates a graph 1200 depicting scan angle versus 3 dB beamwidth of the antenna assembly 1000 of FIG. 10 including the first lens 30", scan angle versus 3 dB beamwidth of the antenna assembly 300 of FIG. 5 including the first lens 30, and scan angle versus 3 dB beamwidth of an antenna assembly having a same construction and excluding the first lenses 30, 30", according to an embodiment of the present disclosure. The scan angle is expressed in degrees (deg) in the abscissa. The 3 dB beamwidth is expressed in degrees (deg) in the ordinate.

In the graph 1200, the scan angle versus 3 dB beamwidth of the antenna assembly 1000 is depicted by a curve 1202, the scan angle versus 3 dB beamwidth of the antenna assembly 300 is depicted by a curve 1204, and the scan angle versus 3 dB beamwidth of the antenna assembly having the same construction and excluding the first lenses 30, 30" is depicted by a curve 1206.

As depicted by the curve 1202, the 3 dB beamwidth of the antenna assembly 1000 is about 12.6 degrees when the scan angle is about 0 degree. Further, the 3 dB beamwidth of the antenna assembly 1000 changes as the scan angle is increased. Specifically, the 3 dB beamwidth of the antenna assembly 1000 increases to about 16.3 degrees when the scan angle is about 50 degrees.

As depicted by the curve 1204, the 3 dB beamwidth of the antenna assembly 300 is about 12.5 degrees when the scan angle is about 0 degree. Further, the 3 dB beamwidth of the antenna assembly 300 changes as the scan angle is increased. Specifically, the 3 dB beamwidth of the antenna assembly 300 increases to about 16.6 degrees when the scan angle is about 50 degrees.

As depicted by the curve 1206, the 3 dB beamwidth of the antenna assembly having the same construction and excluding the first lenses 30, 30" is about 13.9 degrees when the scan angle is about 0 degree. Further, the 3 dB beamwidth of the antenna assembly having the same construction and excluding the first lenses 30, 30" changes as the scan angle is increased. Specifically, the 3 dB beamwidth of the antenna assembly having the same construction and excluding the first lenses 30, 30" increases to about 19.4 degrees when the scan angle is about 50 degrees.

As is apparent from the graph 1200, the 3 dB beamwidth of the antenna assembly 1000 (depicted by the curve 1202) and the 3 dB beamwidth of the antenna assembly 300 (depicted by the curve 1204) are both less than the 3 dB beamwidth of the antenna assembly having the same construction and excluding the first lenses 30, 30" (depicted by the curve 1206) for each value of the scan angle from about 0 degree to about 50 degrees.

Figure 13:
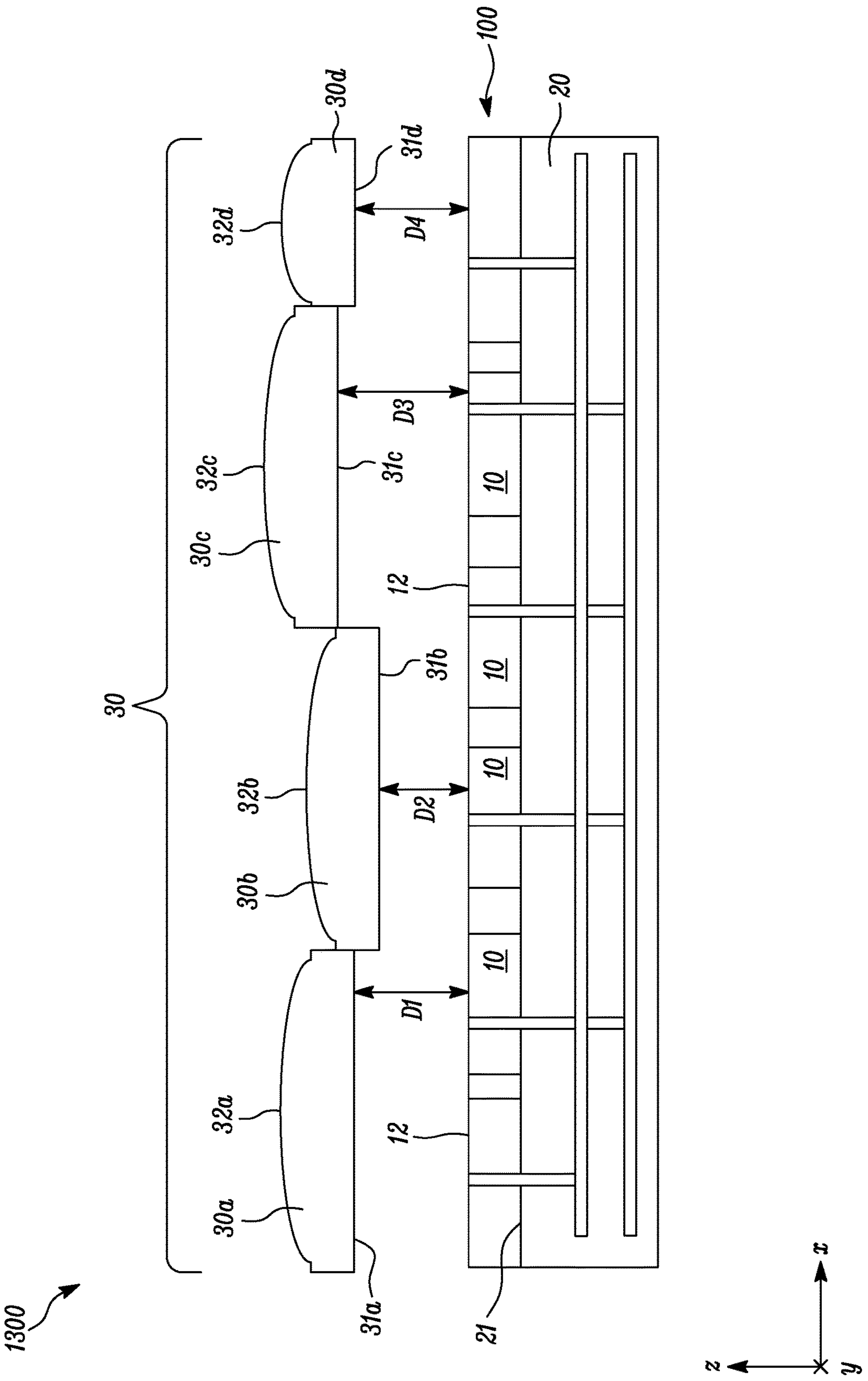
FIG. 13 illustrates a detailed schematic sectional view of an antenna assembly, according to another embodiment of the present disclosure.

FIG. 13 illustrates a detailed schematic sectional view of an antenna assembly 1300, according to another embodiment of the present disclosure. The antenna assembly 1300 is substantially similar to the antenna assembly 300 of FIG. 2. The antenna assembly 1300 includes the phased array antenna 100. The antenna assembly 1300 further includes the one or more lenses 30. In the illustrated embodiment of FIG. 12, the one or more lenses 30 is at least two lenses. In some embodiments, each of the at least two lenses cover a different group of the array of antenna elements 10. Specifically, the one or more lenses 30 of FIG. 13 includes a plurality of lenses. More specifically, the one or more lenses 30 includes four lenses 30*a*-30*d*. In some other embodiments, the one or more lenses 30 may include any number of lenses, as per desired application attributes. Common components between the antenna assembly 300 and the antenna assembly 1300 are referenced by the same reference numerals. Some elements of the antenna assembly 1300 are not shown in FIG. 13 for illustrative purposes.

In some embodiments, each of the one or more lenses 30*a*-30*d* is substantially similar to the first lens 30 (shown in FIG. 2). The one or more lenses 30*a*-30*d* include corresponding substantially planar first bottom surfaces 31*a*-31*d*. In some embodiments, the one or more lenses 30*a*-30*d* are disposed proximate the phased array antenna 100 in a way that the substantially planar first bottom surfaces 31*a*-31*d* of the one or more lenses 30*a*-30*d* are substantially parallel to the first major surface 21. The one or more lenses 30*a*-30*d* are disposed on, and in combination cover, the regular array of antenna elements 10. The one or more lenses 30*a*-30*d* and the antenna elements 10 define respective gaps D1-D4 therebetween. Specifically, the first bottom surfaces 31*a*-31*d* of the one or more lenses 30*a*-30*d* and the tops 12 of the antenna elements 10 define the respective gaps D1-D4 therebetween. In some embodiments, the gap (e.g., D1) defined by at least one lens (e.g., 30*a*) in the plurality of lenses 30*a*-30*d* is different than the gap (e.g., D2) defined by at least one other lens (e.g., 30*b*) in the plurality of lenses 30*a*-30*d*. For example, the gap D1 may be greater than the gap D2, but less than the gap D3.

Further, each of the one or more lenses 30 includes a top surface 32 (shown in FIG. 2). Specifically, the one or more lenses 30*a*-30*d* include respective top surfaces 32*a*-32*d*. Each of the one or more lenses 30 includes a dielectric permittivity of between about 1.2 and about 2. In some embodiments, each of the one or more lenses 30 includes a dielectric permittivity of between about 1.3 and about 1.8, between about 1.4 and about 1.6, or between about 1.4 and about 1.55 at the operational frequency. In some embodiments, each of the one or more lenses 30*a*, 30*b*, 30*c*, 30*d* has a loss tangent of between about 0.001 and about 0.005.

In some embodiments, each top surface 32*a*-32*d* is curved, and has the best-fit spherical radius of curvature R greater than or equal to 50 W0 and less than or equal to 75 W0, i.e., 50 W0≤R≤75 W0. In some embodiments, each top surface 32*a*-32*d* has the best-fit spherical radius of curvature R, such that 55 W0≤R≤70 W0, 60 W0≤R≤70 W0, or 62 W0≤R≤66 W0.

The one or more lenses 30*a*-30*d* include a dielectric permittivity of between about 1.2 and about 2. In some embodiments, the one or more lenses 30*a*-30*d* include a dielectric permittivity of between about 1.3 and about 1.8, between about 1.4 and about 1.6, or between about 1.4 and about 1.55. Further, each of the one or more lenses 30*a*-30*d* has a loss tangent of between about 0.001 and about 0.005. In some embodiments, each of the one or more lenses 30*a*-30*d* has a loss tangent of between about 0.002 and about 0.004, or between about 0.0025 and about 0.004.

Figure 14:
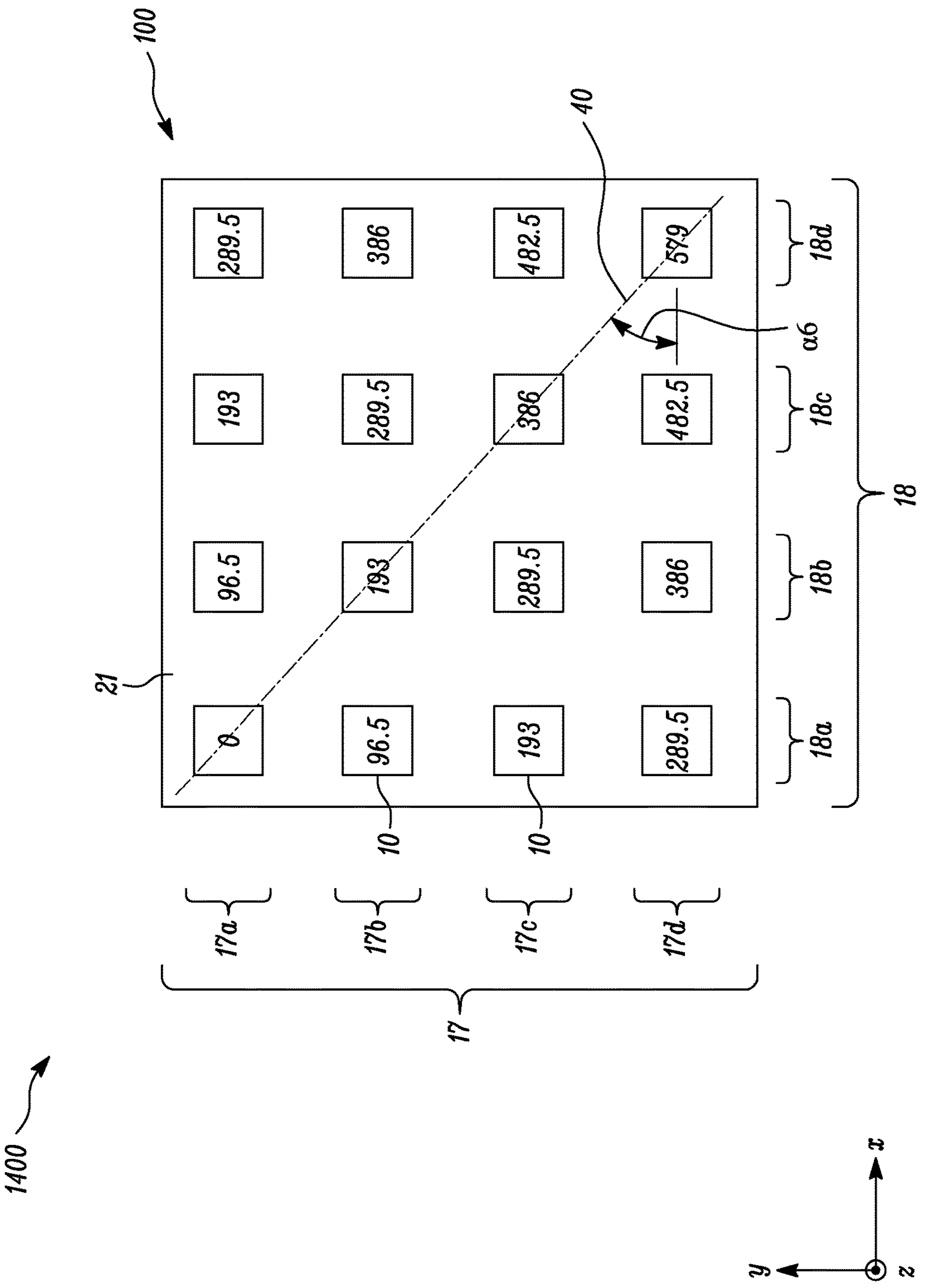
FIG. 14 illustrates another schematic top view of a comparative antenna assembly, according to an embodiment of the present disclosure.

FIG. 14 illustrates a schematic top view of a comparative antenna assembly 1400 including a regular array of at least sixteen antenna elements 10 arranged in the array of four substantially parallel rows 17, specifically, rows 17*a*-17*d*, and four substantially parallel columns 18, specifically, columns 18*a*-18*d*, on the first major surface 21 of the substrate 20 (shown in FIG. 2). The values in the regular array of at least sixteen antenna elements 10 denote the phase difference of corresponding antenna element 10 in degrees.

The array of sixteen antenna elements 10 defines the diagonal plane of symmetry 40 substantially orthogonal to the first major surface 21 and making an angle α6 of between about 40 degrees and 50 degrees with the rows 17 of antenna elements 10. The array of sixteen antenna elements 10 arranged on the first major surface 21 of the substrate 20 defines the plane of symmetry 40 which is substantially orthogonal to the first major surface 21 such that the diagonal plane of symmetry 40 makes the angle α6 of between about 40 degrees and 50 degrees with the rows 17 of the antenna elements 10. In the illustrated embodiment of FIG. 14, the angle α6 is equal to about 45 degrees. Further, the angle α6 is defined between the diagonal plane of symmetry 40 and the x-axis.

Figure 15:
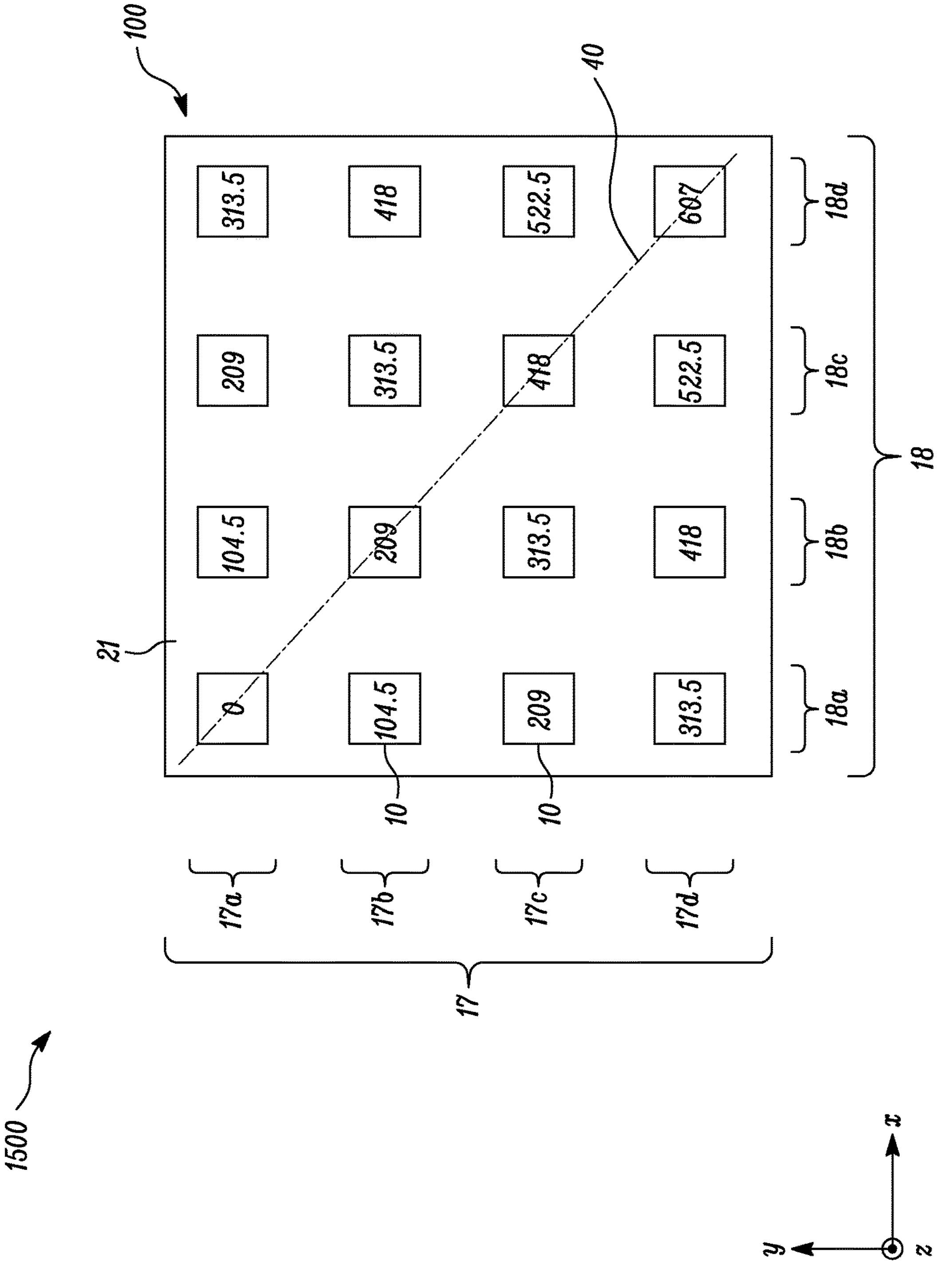
FIG. 15 illustrates a schematic top view of an antenna assembly, according to another embodiment of the present disclosure.

FIG. 15 illustrates a schematic top view of an antenna assembly 1500, according to an embodiment of the present disclosure. The antenna assemblies 1500 includes the array of sixteen antenna elements 10 and the beam shaping element 30 (shown in FIG. 2). The beam shaping element 30 includes a curved top surface (e.g., the top surface 32). Some elements of the antenna assembly 1500 are not shown in FIG. 15 for illustrative purposes. The values in the regular array of at least sixteen antenna elements 10 denote the phase difference of corresponding antenna element 10 in degrees.

The beam shaping element 30 (not shown in FIG. 15) is disposed on and substantially covers the regular array of at least sixteen antenna elements 10. The beam shaping element 30 and the sixteen antenna elements 10 define a gap (e.g., the gap D) therebetween. Specifically, the planar bottom surface 31 defines the gap between the beam shaping element 30 and the sixteen antenna elements. In some embodiments, the gap varies across the sixteen antenna elements.

Referring to FIGS. 5 and 15, it is apparent from FIGS. 14 and 15, when the antenna assembly 1500 steers the beam 50 in the plane of symmetry 40 along the first direction 52 making the angle α3 of between about 40 degrees and about 50 degrees with the normal 53 to the first major surface 21, then the steered beam 50 attains a maximum gain at least when a maximum phase difference between the sixteen antenna elements 10 is greater than by at least 2% as compared to the comparative antenna assembly 1400 that has a same construction except that it does not include the beam shaping element 30. In some embodiments, when the antenna assembly 1500 steers the beam 50 in the plane of symmetry 40 along the first direction 52 making the angle α3 of between about 40 degrees and about 50 degrees with the normal 53 to the first major surface 21, then the steered beam 50 attains the maximum gain at least when the maximum phase difference between the sixteen antenna elements 10 is greater than by at least 3%, at least 4%, at least 5%, at least 6%, at least 7%, at least 8%, at least 9%, at least 10%, at least 12%, or at least 15% as compared to the comparative antenna assembly 1400 that has the same construction except that it does not include the beam shaping element 30.

Therefore, a greater phase difference is required by the antenna assembly 1500 to compensate for a shift in a scan angle of the antenna assembly 1500 due to the beam shaping element 30.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. An antenna assembly comprising:

a regular array of at least sixteen antenna elements, the sixteen antenna elements arranged in an array of four substantially parallel rows and four substantially parallel columns on a first major surface of a substrate, the regular array of sixteen antenna elements defining a diagonal plane of symmetry substantially orthogonal to the first major surface and making an angle of between about 40 degrees and 50 degrees with the rows of antenna elements; and a beam shaping element disposed on and substantially covering the regular array of at least sixteen antenna elements, the beam shaping element and the sixteen antenna elements defining a gap D therebetween, 2 mm≤D≤3 mm, the beam shaping element having a dielectric permittivity of between about 1.2 and about 2 at a frequency of about 28 GHz, and a loss tangent of between about 0.001 and about 0.005, such that when the antenna assembly steers a beam in the plane of symmetry along a first direction making an angle of between about 40 degrees and about 50 degrees with a normal to the first major surface, then the steered beam attains a maximum gain at least when a maximum phase difference between the sixteen antenna elements is greater than by at least 2% as compared to a comparative antenna assembly that has a same construction except that it does not include the beam shaping element.

2. The antenna assembly of claim 1, comprising a regular array of at least sixty four antenna elements, sixteen antenna elements of which form the sixteen antenna elements arranged in the array of four substantially parallel rows and four substantially parallel columns on the first major surface of the substrate.

3. The antenna assembly of claim 1, wherein the beam shaping element comprises a substantially planar bottom surface defining the gap between the focusing element and the sixteen antenna elements, and a curved top surface.

4. The antenna assembly of claim 1, wherein the gap varies across the sixteen antenna elements.

* * * * *